United States Patent
Huang et al.

(10) Patent No.: US 12,533,419 B2
(45) Date of Patent: Jan. 27, 2026

(54) ANTIBODY DRUG CONJUGATE LOADED WITH BINARY TOXINS AND ITS APPLICATION

(71) Applicant: MABPLEX INTERNATIONAL CO., LTD., Shandong (CN)

(72) Inventors: Changjiang Huang, Shandong (CN); Youxiang Sun, Shandong (CN); Jiukai Xiong, Shandong (CN); Nana Kong, Shandong (CN); Xinxin Yan, Shandong (CN)

(73) Assignee: MABPLEX INTERNATIONAL CO., LTD., Shandong (CN)

( * ) Notice: Subject to any disclaimer, the term of this patent is extended or adjusted under 35 U.S.C. 154(b) by 1186 days.

(21) Appl. No.: 17/434,796

(22) PCT Filed: Jul. 19, 2021

(86) PCT No.: PCT/CN2021/107079
§ 371 (c)(1),
(2) Date: Aug. 30, 2021

(87) PCT Pub. No.: WO2023/000131
PCT Pub. Date: Jan. 26, 2023

(65) Prior Publication Data
US 2023/0270874 A1    Aug. 31, 2023

(51) Int. Cl.
| A61K 47/68 | (2017.01) |
| A61K 47/54 | (2017.01) |
| A61K 47/65 | (2017.01) |
| A61P 35/00 | (2006.01) |
| C07K 16/32 | (2006.01) |

(52) U.S. Cl.
CPC ........ *A61K 47/6803* (2017.08); *A61K 47/545* (2017.08); *A61K 47/65* (2017.08); *A61K 47/68031* (2023.08); *A61K 47/68037* (2023.08); *A61K 47/6811* (2017.08); *A61K 47/6855* (2017.08); *A61P 35/00* (2018.01); *C07K 16/32* (2013.01)

(58) Field of Classification Search
CPC .. A61K 47/6803; A61K 47/545; A61K 47/65; A61K 47/68031; A61K 47/68037; A61K 47/6811; A61K 47/6855; A61K 47/6889; A61K 45/06; A61K 38/08; A61K 47/68; A61K 38/05; A61K 47/68033; A61K 2300/00; A61P 35/00; A61P 31/00; A61P 37/02; A61P 37/00; C07K 16/32; C07K 16/00; Y02P 20/55
See application file for complete search history.

(56) References Cited

U.S. PATENT DOCUMENTS

| 2005/0238649 | A1 | 10/2005 | Doronina et al. |
| 2008/0248051 | A1 | 10/2008 | Doronina et al. |
| 2015/0141624 | A1 | 5/2015 | Barnett et al. |
| 2015/0152190 | A1 | 6/2015 | Barnett et al. |
| 2016/0310612 | A1* | 10/2016 | Lyon .................. A61K 47/6885 |
| 2017/0002090 | A1 | 1/2017 | Wang et al. |
| 2017/0119902 | A1 | 5/2017 | Ko et al. |
| 2018/0228906 | A1 | 8/2018 | Helin et al. |
| 2020/0129639 | A1* | 4/2020 | Levengood ........ A61K 47/6809 |
| 2021/0228728 | A1 | 7/2021 | Li et al. |
| 2021/0230218 | A1 | 7/2021 | Li et al. |
| 2021/0393733 | A1 | 12/2021 | Li et al. |
| 2022/0062371 | A1 | 3/2022 | Mutter et al. |
| 2022/0251228 | A1 | 8/2022 | Hua et al. |

FOREIGN PATENT DOCUMENTS

| CN | 101573384 | | 11/2009 |
| CN | 106132431 | | 11/2016 |
| CN | 108653746 | | 10/2018 |
| CN | 108743966 | | 11/2018 |
| CN | 107778372 | A | 11/2019 |
| CN | 110997010 | A | 4/2020 |
| CN | 112569368 | A | 3/2021 |
| EP | 3756663 | A1 | 12/2020 |
| EP | 3797796 | A1 | 3/2021 |
| EP | 3828196 | A1 | 4/2022 |
| JP | 2010523469 | A | 7/2010 |
| JP | 2018118953 | A | 8/2018 |
| RU | 2448117 | C2 | 12/2007 |
| RU | 2685728 | C2 | 8/2018 |
| WO | WO2013185117 | A1 | 12/2013 |
| WO | WO2013192360 | A1 | 12/2013 |

(Continued)

OTHER PUBLICATIONS

Sanderson RJ, Hering MA, James SF, Sun MM, Doronina SO, Siadak AW, Senter PD, Wahl AF. In vivo drug-linker stability of an anti-CD30 dipeptide-linked auristatin immunoconjugate. Clin Cancer Res. Jan. 15, 2005;11(2 Pt 1):843-52. PMID: 15701875. (Year: 2005).*

Garewal HS, Ramsey L, Kaugars G, Boyle J. Clinical experience with the micronucleus assay. J Cell Biochem Suppl. 1993;17F:206-12. doi: 10.1002/jcb.240531031. PMID: 8412196. (Year: 1993).*

Lichtman Ma. A Bacterial Cause of Cancer: An Historical Essay. Oncologist. May 2017;22(5):542-548. doi: 10.1634/theoncologist.2017-0007. Epub Apr. 21, 2017. PMID: 28432224; PMCID: PMC5423514. (Year: 2017).*

Rashid Hu, Xu Y, Muhammad Y, Wang L, Jiang J. Research advances on anticancer activities of matrine and its derivatives: An updated overview. Eur J Med Chem. Jan. 1, 2019;161:205-238. doi: 10.1016/j.ejmech.2018.10.037. Epub Oct. 19, 2018. PMID: 30359819. (Year: 2019).*

(Continued)

*Primary Examiner* — Adam Weidner
*Assistant Examiner* — Laura Ann Essex
(74) *Attorney, Agent, or Firm* — pH IP Law

(57) ABSTRACT

The present disclosure provides an antibody-drug conjugate loaded with binary toxins. By connecting MMAF with another drug unit in series at the cysteine binding site on the antibody, the two can exert a significant synergistic effect, thereby effectively improving the effect of killing tumor cells. This provides a new solution for the development of high-efficiency and low-toxic ADCs.

14 Claims, No Drawings

Specification includes a Sequence Listing.

(56) References Cited

FOREIGN PATENT DOCUMENTS

| WO | WO 2015/057876 A1 | 4/2015 |
|---|---|---|
| WO | WO2016001485 A1 | 1/2016 |
| WO | WC 2016/127790 | 8/2016 |
| WO | WO 2018/112253 A1 | 6/2018 |
| WO | WO 2019/034177 A1 | 2/2019 |
| WO | WO2019096867 A1 | 5/2019 |
| WO | WO2020073345 A1 | 4/2020 |
| WO | WO2020263943 A1 | 12/2020 |
| WO | WO 2021/018168 A1 | 2/2021 |
| WO | WO2021022678 A1 | 2/2021 |

OTHER PUBLICATIONS

Wan Y, Li Y, Yan C, Yan M, Tang Z. Indole: A privileged scaffold for the design of anti-cancer agents. Eur J Med Chem. Dec. 1, 2019;183:111691. doi: 10.1016/j.ejmech.2019.111691. Epub Sep. 11, 2019. PMID: 31536895. (Year: 2019).*

Johansson MP, Maaheimo H, Ekholm FS. New insight on the structural features of the cytotoxic auristatins MMAE and MMAF revealed by combined NMR spectroscopy and quantum chemical modelling. Sci Rep. Nov. 21, 2017;7(1):15920. doi: 10.1038/s41598-017-15674-1. PMID: 29162861; PMCID: PMC5698355. (Year: 2017).*

Levengood et al. "Orthogonal Cysteine Protection Enables Homogeneous Multi- Drug Antibody-Drug Conjugates." Angewandte Chemie (International ed. in English) vol. 56,3: 733-737, 2017.

International Search Report issued in PCT/CN2021/107079, dated Feb. 25, 2022, and English language translation thereof.

Office Action issued in Russian Application No. RU2021125382, dated Mar. 23, 2022, and English language translation thereof.

Office Action issued in Australian Application No. 2021225125, dated Mar. 23, 2022.

Dyson et al., "Chemistry of Synthetic Drugs" Mir Moscow, 96:12-19, 1964 {English Translation}.

Office Communication issued in correspondence Chinese Application No. 202180002141.5 dated Sep. 7, 2022 {English translation}.

Office Communication issued in correspondence Russian Application No. 2021125382/04 dated Oct. 19, 2022 {English translation}.

English Translation of Office Action in Japanese Patent Application No. 2022-503434, dated Jul. 4, 2023.

Extended European Search Report issued in European Patent Application No. 21838960.9, dated Aug. 23, 2023.

Kumar, A. et al., "Synthesis of a heterotrifunctional linker for the site-specific preparation of antibody-drug conjugates with two distinct warheads," *Bioorganic & Medicinal Chemistry Letters*, 28 (2018): 3617-3621.

Sharma, A. et al., "Binary Prodrug of Dichloroacetic Acid and Doxorubicin with Enhanced Anticancer Activity," *ACS Applied Bio Materials*, 4 (2021): 2026-2032.

Singaporean Office Action issued in Singapore Patent Application No. 11202200215Q, dated May 10, 2023.

Świderska, K. W. et al., "FGF2 Dual Warhead Conjugate with Monomethyl Auristatin E and α-Amanitin Displays a Cytotoxic Effect towards Cancer Cells Overproducing FGF Receptor 1," *Intenational Journal of Molecular Sciences*, 19 (2018): 2098, 1-16.

Tang, Y. et al., "Real-Time Analysis on Drug-Antibody Ratio of Antibody-Drug Conjugates for Synthesis, Process Optimization, and Quality Control," *Scientific Reports*, 7 (2017): 7763, 1-10.

Yamazaki, C. M. et al., "Antibody-drug conjugates with dual payloads for combating breast tumor heterogeneity and drug resistance," *Nature Communications*, 12 (2021): 3528, 1-13.

Li et al., "Synthesis and Evaluation of Camptothecin Antibody-Drug Conjugates", *ACS Med. Chem. Lett.*, vol. 10, pp. 1386-1392, 2019.

\* cited by examiner

SEQUENCE LISTING

<160> NUMBER OF SEQ ID NOS: 3

<210> SEQ ID NO 1
<211> LENGTH: 4
<212> TYPE: PRT
<213> ORGANISM: Artificial
<220> FEATURE:
<223> OTHER INFORMATION: The sequence is synthesized

```
<400> SEQUENCE: 1

Gly Gly Phe Gly
1

<210> SEQ ID NO 2
<211> LENGTH: 4
<212> TYPE: PRT
<213> ORGANISM: Artificial
<220> FEATURE:
<223> OTHER INFORMATION: The sequence is synthesized

<400> SEQUENCE: 2

Gly Phe Leu Gly
1

<210> SEQ ID NO 3
<211> LENGTH: 4
<212> TYPE: PRT
<213> ORGANISM: Artificial
<220> FEATURE:
<223> OTHER INFORMATION: The sequence is synthesized

<400> SEQUENCE: 3

Ala Leu Ala Leu
1
```

ANTIBODY DRUG CONJUGATE LOADED WITH BINARY TOXINS AND ITS APPLICATION

This application is a national phase application under 35 U.S.C. § 371 of International Application No. PCT/CN2021/107079, filed Jul. 19, 2021, the entirety of which is incorporated herein by reference.

This application contains a Sequence Listing, which has been submitted electronically and is hereby incorporated by reference in its entirety. The Sequence Listing was created on Mar. 18, 2025, is named UNIT.P0062US.sequence listing.20250318.txt and is 1 KB.

FIELD

The present disclosure relates to the field of antibody drug conjugates, and specifically to an antibody drug conjugate loaded with binary toxins through an antibody.

BACKGROUND

Antibody-drug conjugate (ADC) refers to a biological drug that a biologically active drug (Drug) is linked to an antibody (Antibody) through a chemical linker (Linker). ADC is like a precision-guided weapon system, in which the biologically active drug acts as killing ammunition to accurately strike diseased cells under the guidance of the antibody. Therefore, ADC combines the dual advantages of high efficiency of cytotoxic drug molecules and high targeting of antibodies.

As of March 2021, only 11 antibody-conjugated drugs have been approved worldwide (as shown in Table 1), and they are all ADC molecules in which one target antibody is coupled to one toxin molecule. Due to the limited number of antigens on the surface of tumor cells, the level of antigen expression required for effective ADC activity varies depending on the characteristics of different antigens. ADC requires at least 104 antigens/cell to ensure the delivery of lethal amounts of cytotoxic drugs. Ideally, the antigen targeted by the antibody portion of the ADC should be uniformly expressed on the surface of tumor cells and have a high copy number (>$10^5$/cell). However, the reality is that there are usually only a limited number of antigens on the surface of tumor cells (about 5000 to $10^6$ antigens/cell), the ideal average DAR value of ADC is 3.5-4 (for example, the average DAR value of Brentuximab vedotin is 4, and the average DAR value of Trastuzumab emtansine is 3.5), and the amount of drug delivered to tumor cells is very low, so the drug effect on tumor cells is poor, which is also considered to be one of the main reasons for the clinical failure of ADC.

TABLE 1

Marketed antibody-drug conjugates

| Drug Generic Name | Company | Target | Time to Market |
|---|---|---|---|
| Brentuximab vedotin | Seattle, Takeda | CD30 | Launched/2011 |
| Ado-trastuzumab emtansine | Genentech | Her2 | Launched/2013 |
| Inotuzumab ozogamicin | Pfizer | CD22 | Launched/2017 |
| Gemtuzumab ozogamicin | Pfizer | CD33 | Launched/2017 |
| Moxetumomab pasudotox-tdfk | AstraZeneca | CD22 | Launched/2018 |
| Enfortumab vedotin-ejfv | Seattle/Astellas | Nectin-4 | Launched/2019 |
| Polatuzumab vedotin-piiq | Genentech | CD79b | Launched/2019 |

TABLE 1-continued

Marketed antibody-drug conjugates

| Drug Generic Name | Company | Target | Time to Market |
|---|---|---|---|
| Fam-trastuzumab deruxtecan-nxki | AstraZeneca/ Daiichi Sankyo | Her2 | Launched/2019 |
| Sacituzumab govitecan-hziy | Immunomedics | Trop2 | Launched/2020 |
| Belantamab mafodotin | Glaxosmithkline (Ireland) Ltd | BCMA | Launched/2020 |
| Cetuximab sarotalocan | Rakuten Medical | EGFR | Launched/2020 |

Note:
Mylotarg was withdrawn from the market in 2010 after it was approved for listing in 2000, and was re-approved for listing in 2017.

SUMMARY

In order to solve the above problems, the present disclosure provides an antibody-drug conjugate capable of loading binary toxins. Specifically, the present disclosure provides an antibody-drug conjugate comprising the following structure:

(I)

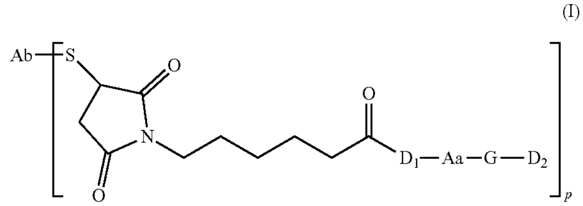

Wherein:

Ab is an antibody or antigen-binding fragment;

S is the sulfur atom in the sulfhydryl residue formed after the interchain disulfide bond on the Ab is opened;

Aa is an amino acid unit comprising one or more amino acids;

G is an optional cracking unit;

$D_1$ is MMAF;

$D_2$ is a second active drug unit other than MMAF;

p is an integer selected from 1, 2, 3, 4, 5, 6, 7, and 8.

The antibody or antigen-binding fragment Ab is reactive with antigens related to cancer, infectious disease or autoimmune disease, or their epitopes; Optionally, Ab is an intact antibody, a fragment (such as Fab, Fab', $F(ab)_2$, and $F(ab')_2$) or a subfragment (such as a single-chain construct) derived from a murine, chimeric, primate, humanized, or human monoclonal antibody, and the antibody includes a bispecific antibody and a multispecific antibody. Optionally, Ab is a intact form of a murine, chimeric, primate, humanized, or human monoclonal antibody, and the Ab has the Fc domain and hinge domain of a human IgG1 or human IgG4 antibody, or a form with partial amino acid mutations, substitutions or deletions thereof.

The first active drug unit $D_1$ is selected from auristatin cytotoxic agents; preferably, the first active drug unit $D_1$ contains a free carboxyl group.

In some preferred embodiments, the first active drug unit $D_1$ is selected from the following structure or a tautomer, mesomer, racemate, enantiomer, diastereomer thereof or a mixture thereof, or a pharmaceutically acceptable salt or solvate thereof:

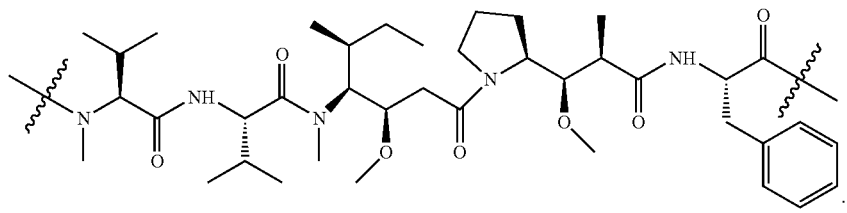 [SMILES: *C(=O)[C@H](Cc1ccccc1)NC(=O)[C@H](C)[C@@H](OC)[C@@H]1CCCN1C(=O)C[C@@H](OC)[C@H]([C@@H](C)CC)N(C)C(=O)[C@@H](NC(=O)[C@H](C(C)C)N(*)C)C(C)C]

The second active drug unit $D_2$ is selected from the group consisting of a cytotoxic molecule, an immune enhancer, and a radioisotope; the cytotoxic molecule includes but is not limited to a tubulin inhibitor, a DNA damaging agent, a topoisomerase inhibitor, an ALK inhibitor, and a PARP inhibitor; more preferably, the tubulin inhibitor includes but is not limited to dolastatin and auristatin cytotoxic molecules, maytansine cytotoxic molecules; the DNA damaging agent includes but is not limited to calicheamicins, duocarmycins and anthramycins derivative PBD; the topoisomerase inhibitor includes camptothecins and camptothecin derivatives; more preferably, the auristatin cytotoxic molecules include but are not limited to MMAE or MMAF or a derivative thereof, and the maytansine cytotoxic molecules include but are not limited to DM1, DM4 or a derivative thereof.

In some preferred embodiments, the second active drug unit $D_2$ is selected from an ALK inhibitor, a PARP inhibitor, and a topoisomerase inhibitor.

In some more preferred embodiments, the second active drug unit $D_2$ is selected from the following structures or a tautomer, mesomer, racemate, enantiomer, diastereomer thereof or a mixture thereof, or a pharmaceutically acceptable salt or solvate thereof:

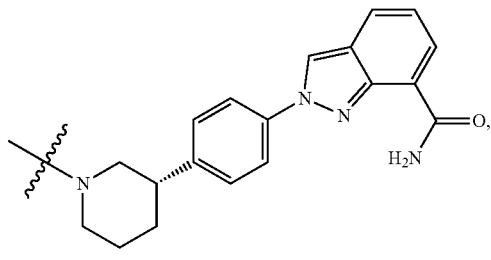

(MK4827)

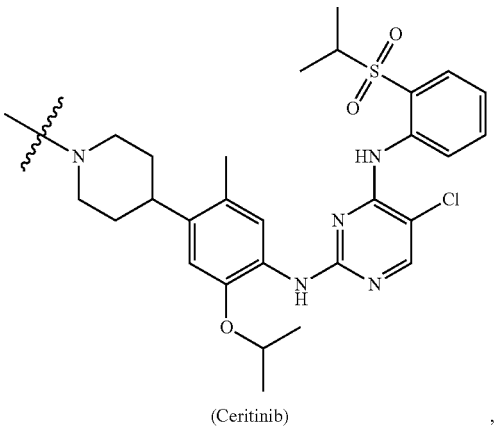

(Ceritinib),

-continued

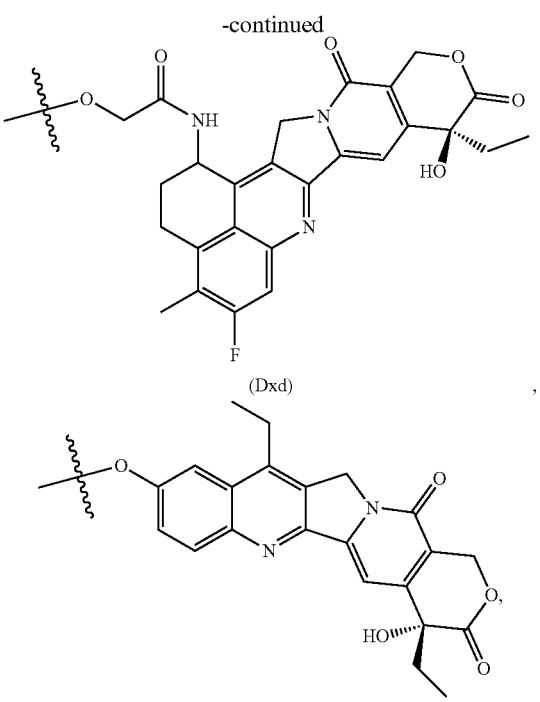

(Dxd)

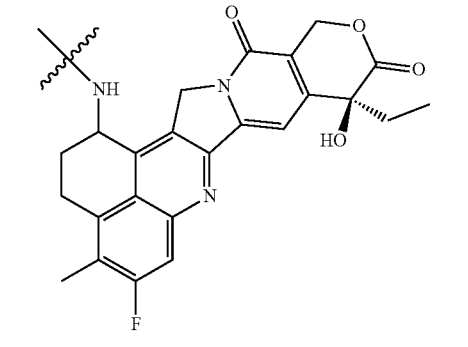

(SN38)

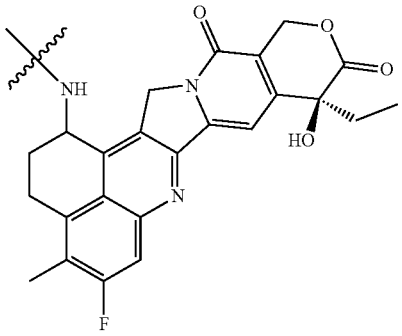

(Exatecan).

In some preferred embodiments, the first active drug unit $D_1$ and the second active drug unit $D_2$ are MMAF and SN38, respectively.

In some preferred embodiments, the first active drug unit $D_1$ and the second active drug unit $D_2$ are MMAF and MK4827, respectively.

In some preferred embodiments, the first active drug unit $D_1$ and the second active drug unit $D_2$ are MMAF and Ceritinib, respectively.

In some preferred embodiments, the first active drug unit $D_1$ and the second active drug unit $D_2$ are MMAF and Dxd, respectively.

In some preferred embodiments, the first active drug unit $D_1$ and the second active drug unit $D_2$ are MMAF and Exatecan, respectively.

The amino acid unit Aa may contain one amino acid selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the Aa is selected from the group consisting of -valine-, -citrulline-, -alanine-, -lysine-, -lysine(trityl)-, -lysine(monomethoxytrityl)-, -lysine(fluorenylmethoxycarbonyl)-, -arginine-, -phenylalanine-, -glycine-, -leucine-, and -isoleucine-.

The amino acid unit Aa may contain two amino acids, and the two may be the same or different. They are each independently selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the amino acid is selected from the group consisting of -valine-, -citrulline-, -alanine-, -lysine-, -lysine(trityl)-, -lysine(monomethoxytrityl)-, -lysine(fluorenylmethoxycarbonyl)-, -arginine-, -phenylalanine-, -glycine-, -leucine-, and -isoleucine-.

The amino acid unit Aa may contain three amino acids, and the three may be the same or different. They are each independently selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the amino acid is selected from the group consisting of -valine-, -citrulline-, -alanine-, -lysine-, -lysine(trityl)-, -lysine(monomethoxytrityl)-, -lysine(fluorenylmethoxycarbonyl)-, -arginine-, -phenylalanine-, -glycine-, -leucine-, and -isoleucine-.

The amino acid unit Aa may contain four amino acids, and the four may be the same or different. They are each independently selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the amino acid is selected from the group consisting of -valine-, -citrulline-, -alanine-, -lysine-, -lysine(trityl)-, -lysine(monomethoxytrityl)-, -lysine(fluorenylmethoxycarbonyl)-, -arginine-, -phenylalanine-, -glycine-, -leucine-, and -isoleucine-; n is an integer selected from 0 and 1, and when n is 0, $AA_4$ and $D_2$ are directly covalently linked.

In some preferred embodiments, the amino acid unit Aa is selected from the group consisting of -valine-citrulline- (-Val-Cit-), -valine-alanine- (-Val-Ala-), -valine-lysine- (-Val-Lys-), -valine-lysine(trityl)- (-Val-Lys(Trt)-), -valine-lysine(monomethoxytrityl)- (-Val-Lys(Mmt)-), -valine-lysine(fluorenylmethoxycarbonyl)- (-Val-Lys(Fmoc)-), -valine-arginine- (-Val-Arg-), -phenylalanine-citrulline- (-Phe-Cit-), -phenylalanine-lysine- (-Phe-Lys-), -phenylalanine-lysine(trityl)- (-Phe-Lys(Trt)-), -phenylalanine lysine (monomethoxytrityl)- (-Phe-Lys(Mmt)-), -phenylalanine-lysine(fluorenylmethoxycarbonyl)- (-Phe-Lys(Fmoc)-), -leucine-citrulline- (-Leu-Cit-), -isoleucine-citrulline- (-Ile-Cit-), and -phenylalanine-arginine- (-Phe-Arg-);

In other preferred embodiments, the amino acid unit Aa is -phenylalanine-arginine-arginine- (-Ala-Arg-Arg-);

In other preferred embodiments, the amino acid unit Aa is selected from the group consisting of -glycine-glycine-phenylalanine-glycine- (-Gly-Gly-Phe-Gly-), -glycine-phenylalanine-leucine-glycine- (-Gly-Phe-Leu-Gly-), and -alanine-leucine-alanine-leucine (-Ala-Leu-Ala-Leu-).

Optionally, the structure of the amino acid unit Aa can be selected from the following:

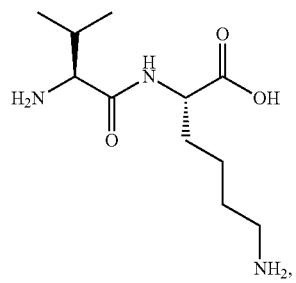

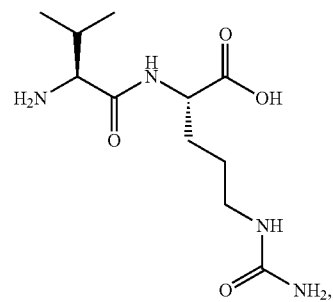

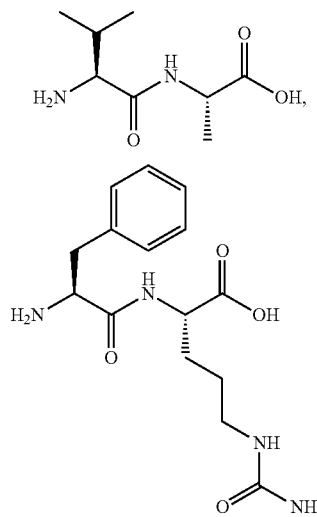

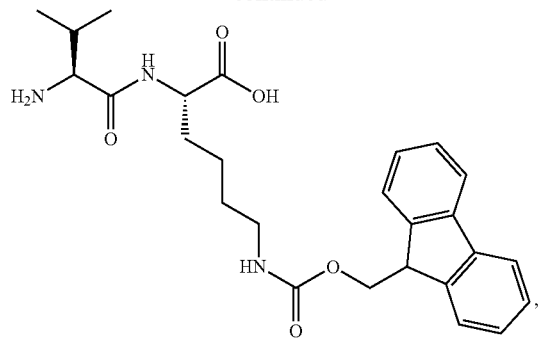
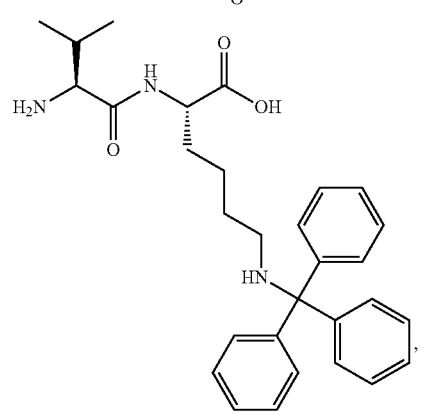
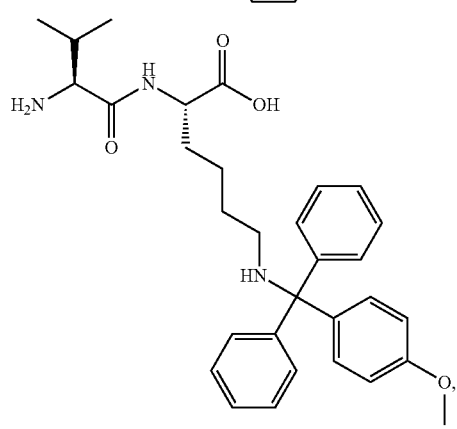
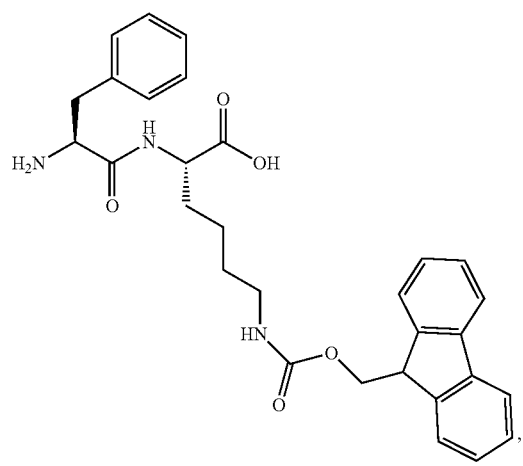
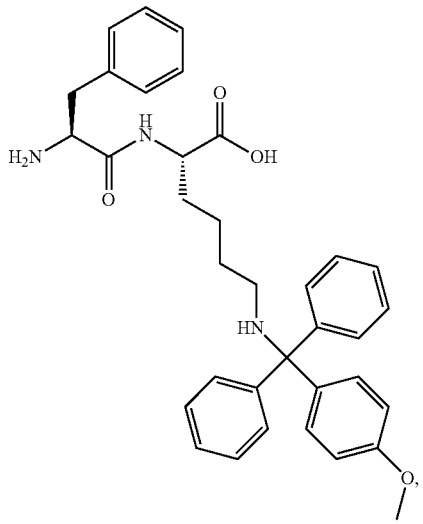
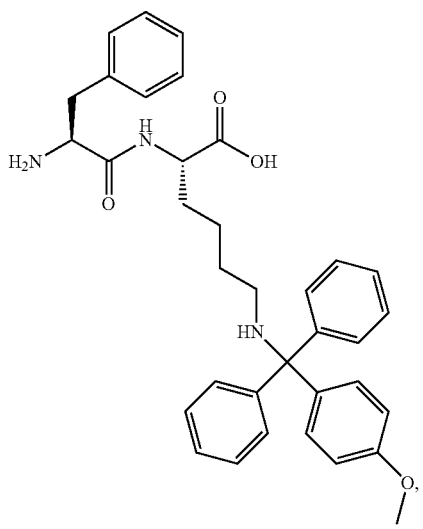
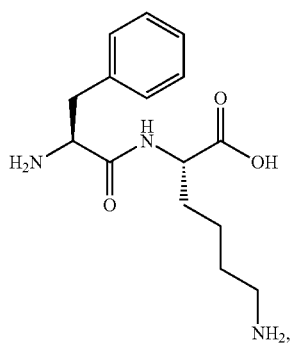

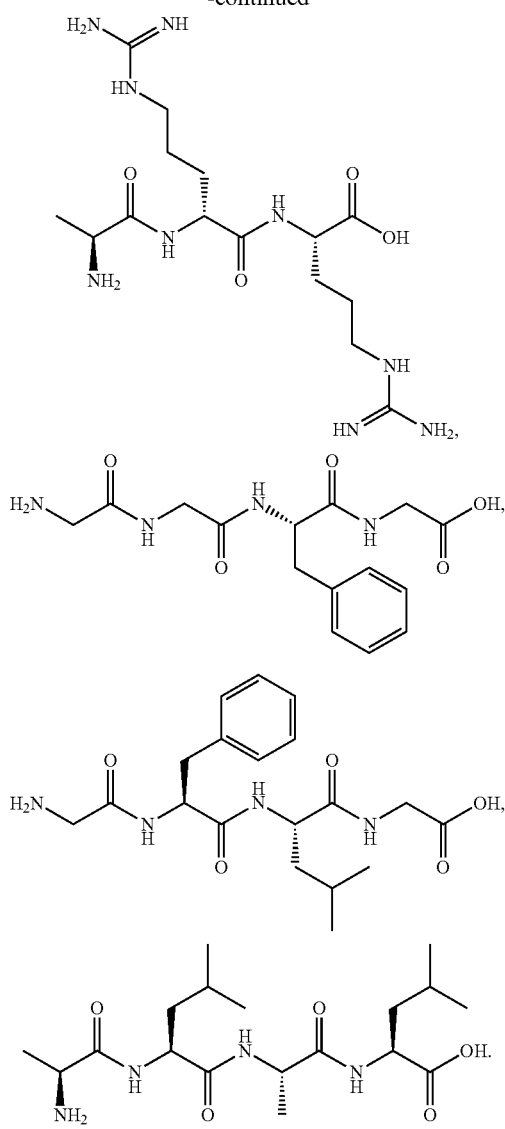

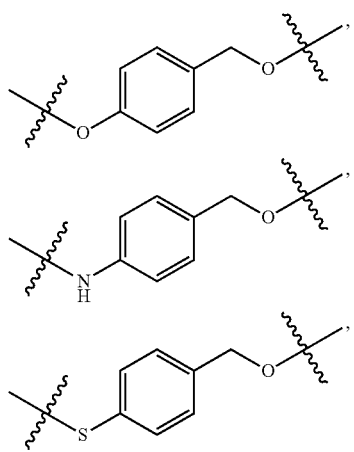

In some particular embodiments, the self-cracking unit G is null or selected from the following structures:

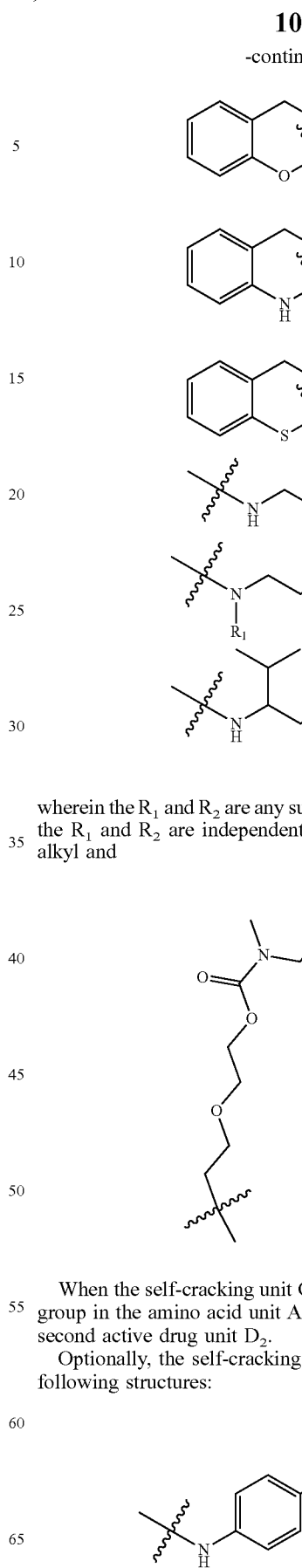

wherein the $R_1$ and $R_2$ are any substituent groups; preferably, the $R_1$ and $R_2$ are independently selected from H, $C_1$-$C_{10}$ alkyl and When the self-cracking unit G is null, the last amino acid group in the amino acid unit Aa is covalently linked to the second active drug unit $D_2$.

Optionally, the self-cracking unit G is selected from the following structures:

-continued

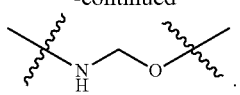

In some specific embodiments, the antibody-drug conjugate is selected from the following structures, wherein p is an integer selected from 1, 2, 3, 4, 5, 6, 7, and 8:

ture of a medicament for the treatment or prevention of a cancer, infectious disease or autoimmune disease.

The cancer refers to a hematopoietic tumor, carcinoma, sarcoma, melanoma, or glial tumor, for example without limitation selected from the group consisting of breast cancer, ovarian cancer, cervical cancer, uterine cancer, prostate cancer, kidney cancer, urethral cancer, bladder cancer, liver cancer, stomach cancer, endometrial cancer, salivary gland cancer, esophageal cancer, lung cancer, colon cancer,

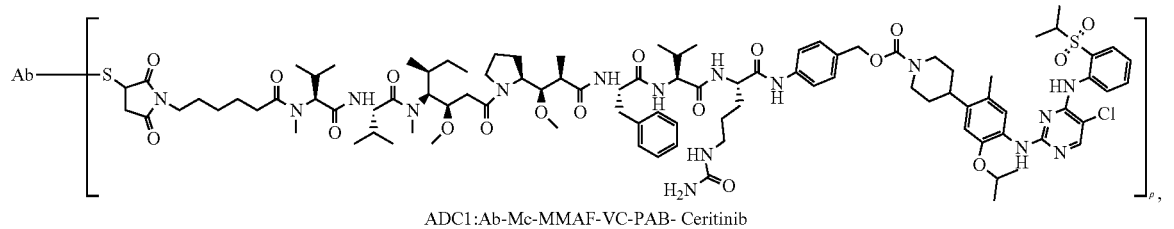

ADC1:Ab-Mc-MMAF-VC-PAB-Ceritinib

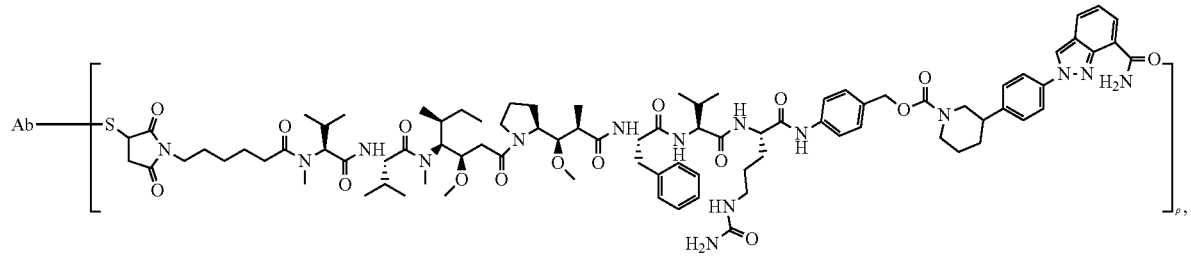

ADC2:Ab-Mc-MMAF-VC-PAB-MK4827

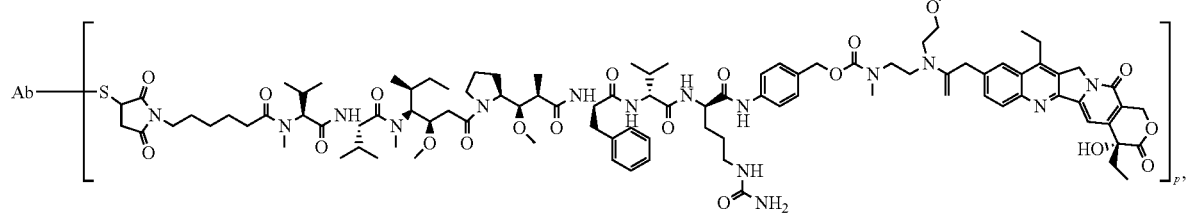

ADC3:Ab-Mc-MMAF-VC-PAB-DMEDA-PEG(N3)-SN38

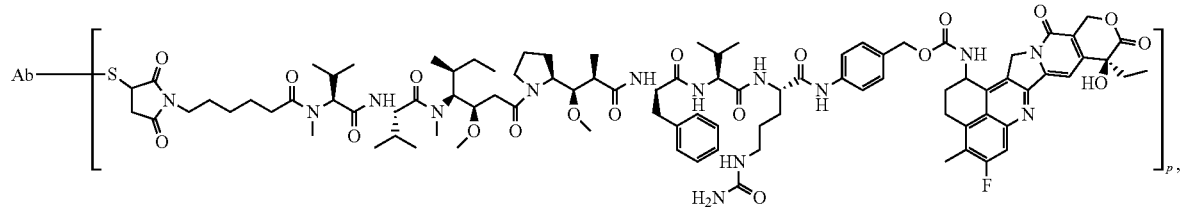

ADC4:Ab-Mc-MMAF-VC-PAB-Exatecan

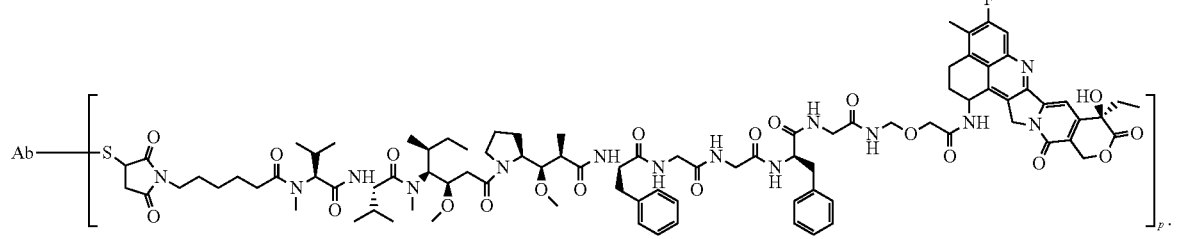

ADC5:Ab-Mc-MMAF-GGFG-Dxd

The present disclosure also relates to use of the antibody-drug conjugate of any one of the foregoing in the manufacrectal cancer, colorectal cancer, bone cancer, skin cancer, thyroid cancer, pancreatic cancer, melanoma, glioma, neuroblastoma, glioma multiforme, sarcoma, lymphoma, leukemia, and other solid tumors or hematological tumors.

The autoimmune disease refers to a disease caused by the body's immune response to its own tissues, such as but not limited to: immune-mediated thrombocytopenia, dermatomyositis, Sjogren's syndrome, multiple sclerosis, Sidenham's chorea, myasthenia gravis, systemic lupus erythematosus, lupus nephritis, rheumatic fever, rheumatoid arthritis, polyglandular syndrome, bullous pemphigoid, diabetes, Henoch-Schonlein purpura, post-streptococcal nephritis, erythema nodosum, Takayasu's artefifis, Addison's disease, sarcoidosis, ulcerative colitis, erythema multiforme, IgA nephropathy, nodular polyarteritis, ankylosing spondylitis, Goodpasture's syndrome, thromboangiitis obliterans, primary biliary cirrhosis, Hashimoto's thyroiditis, thyrotoxicosis, scleroderma, chronic active hepatitis, polymyositis/dermatomyositis, polychondritis, pemphigus vulgaris, Wegener's granulomatosis, membranous nephropathy, amyotrophic lateral sclerosis, tabes *dorsalis*, giant cell arteritis/polymyalgia, pernicious anemia, rapidly progressive glomerulonphritis, fibrotic alveolitis, juvenile diabetes and new diseases.

The infectious disease mainly refers to pathogenic biological infections, including but not limited to: human immunodeficiency virus (HIV), *Mycobacterium tuberculosis, Streptococcus agalactiae*, methicillin-resistant *Staphylococcus aureus, Legionella pneumophila, Streptococcus pyogenes, Escherichia coli, Neisseria gonorrhoeae, Neisseria meningitidis*, Pneumococcus, *Haemophilus influenzae* type B, *Treponema pallidum*, lyme disease spirochete, West Nile virus, *Pseudomonas aeruginosa, Mycobacterium leprosy, Bacillus abortus*, rabies virus, influenza virus, cytomegalovirus, herpes simplex virus type I, herpes simplex virus type II, human serum parvovirus, respiratory syncytial virus, varicella-zoster virus, hepatitis B virus, measles virus, adenovirus, human T-cell leukemia virus, Epstein-Barr virus, murine leukemia virus, mumps virus, vesicular stomatitis virus, Sindbis virus, lymphocytic choroid meningitis virus, wart virus, bluetongue virus, Sendai virus, feline leukemia virus, reovirus, polio virus, simian virus 40, murine breast tumor virus, dengue fever virus, rubella virus, *Plasmodium falciparum, Plasmodium vivax, Toxoplasma murine, Trypanosoma japonicum, Trypanosoma cruzi, Trypanosoma* Rhodesia, *Trypanosoma brucei, Schistosoma mansonii, Schistosoma japonicum, Babesia bovis, Eimeria tenella*, Onchocercia, *Leishmania tropicalis, Trichinella spiralis, Theileria parvum, Vesicular tapeworm, Taenia ovis, Beef tapeworm, Echinococcus granulosus, Mesocestoides corti, Mycoplasma arthritis, Mycoplasma hyorhinis, Mycoplasma orale, Mycoplasma* arginine, Acholeplasma laidlawii, *Mycoplasma salivarius, Mycoplasma* pneumonia and new diseases.

The present disclosure also provides an intermediate compound, the structure of which is shown in the following formula:

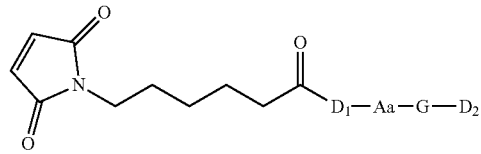

(II)

Wherein:
Aa is an amino acid unit comprising one or more amino acids;
G is an optional cracking unit;
$D_1$ is MMAF;
$D_2$ is a second active drug unit other than MMAF.

The first active drug unit $D_1$ is selected from auristatin cytotoxic agents; preferably, the first active drug unit $D_1$ contains a free carboxyl group.

In some preferred embodiments, the first active drug unit $D_1$ is selected from the following structure or a tautomer, mesomer, racemate, enantiomer, diastereomer thereof or a mixture thereof, or a pharmaceutically acceptable salt or solvate thereof.

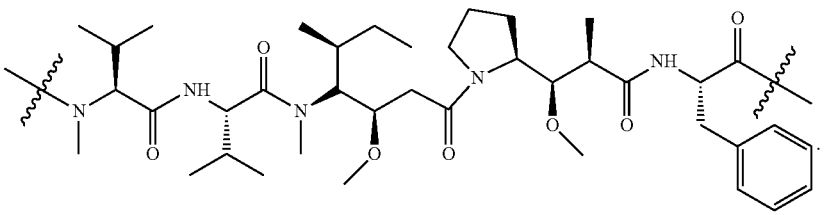

The second active drug unit $D_2$ is selected from the group consisting of a cytotoxic molecule, an immune enhancer, and a radioisotope; the cytotoxic molecule includes but is not limited to a tubulin inhibitor, a DNA damaging agent, a topoisomerase inhibitor, an ALK inhibitor, and a PARP inhibitor; more preferably, the tubulin inhibitor includes but is not limited to dolastatin and auristatin cytotoxic molecules, maytansine cytotoxic molecules; the DNA damaging agent includes but is not limited to calicheamicins, duocarmycins and anthramycins derivative PBD; the topoisomerase inhibitor includes camptothecins and camptothecin derivatives; more preferably, the auristatin cytotoxic molecules include but are not limited to MMAE or MMAF or a derivative thereof, and the maytansine cytotoxic molecules include but are not limited to DM1, DM4 or a derivative thereof.

In some preferred embodiments, the second active drug unit $D_2$ is selected from an ALK inhibitor, a PARP inhibitor, and a topoisomerase inhibitor.

In some more preferred embodiments, the second active drug unit $D_2$ is selected from the following structures or a tautomer, mesomer, racemate, enantiomer, diastereomer thereof or a mixture thereof, or a pharmaceutically acceptable salt or solvate thereof:

(MK4827)

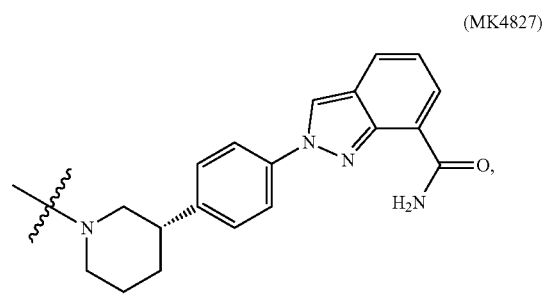

(Ceritinib)

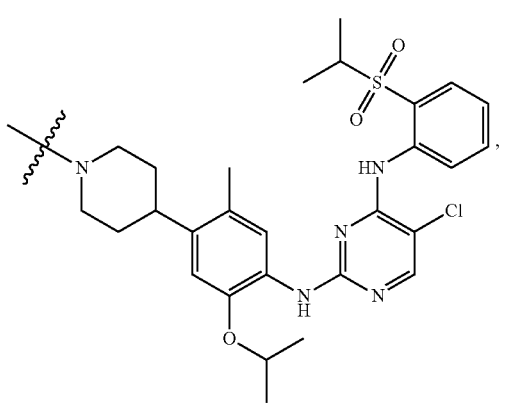

(Dxd)

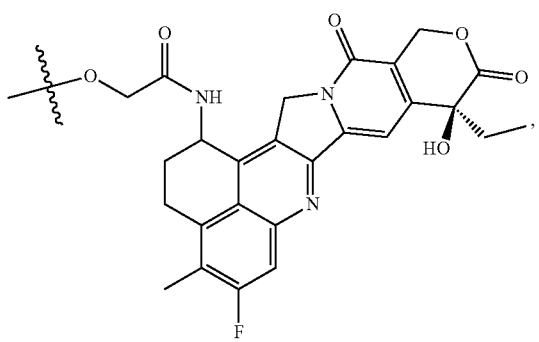

(SN38)

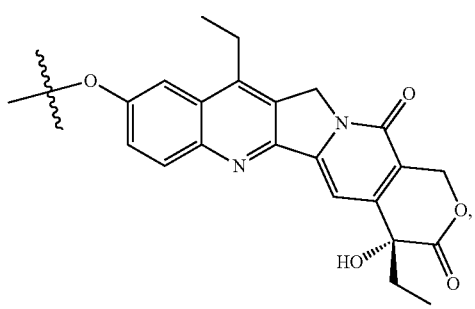

(Exatecan)

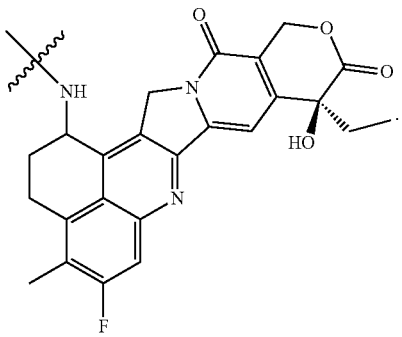

In some preferred embodiments, the first active drug unit $D_1$ and the second active drug unit $D_2$ are MMAF and SN38, respectively.

In some preferred embodiments, the first active drug unit $D_1$ and the second active drug unit $D_2$ are MMAF and MK4827, respectively.

In some preferred embodiments, the first active drug unit $D_1$ and the second active drug unit $D_2$ are MMAF and Ceritinib, respectively.

In some preferred embodiments, the first active drug unit $D_1$ and the second active drug unit $D_2$ are MMAF and Dxd, respectively.

In some preferred embodiments, the first active drug unit $D_1$ and the second active drug unit $D_2$ are MMAF and Exatecan, respectively.

The amino acid unit Aa may contain one amino acid selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the Aa is selected from the group consisting of -valine-, -citrulline-, -alanine-, -lysine-, -lysine(trityl)-, -lysine(monomethoxytrityl)-, -lysine (fluorenylmethoxycarbonyl)-, -arginine-, -phenylalanine-, -glycine-, -leucine-, and -isoleucine-.

The amino acid unit Aa may contain two amino acids, which may be the same or different. They are all independently selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the amino acid is selected from the group consisting of -valine-, -citrulline-, -alanine-, -lysine-, -lysine(trityl)-, -lysine (monomethoxytrityl)-, -lysine(fluorenylmethoxycarbonyl)-, -arginine-, -phenylalanine-, -glycine-, -leucine-, and -isoleucine-.

The amino acid unit Aa may contain three amino acids, which may be the same or different. They are all independently selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the amino acid is selected from the group consisting of -valine-, -citrulline-, -alanine-, -lysine-, -lysine(trityl)-, -lysine(monomethoxytrityl)-, -lysine(fluorenylmethoxycarbonyl)-, -arginine-, -phenylalanine-, -glycine-, -leucine-, and -isoleucine-.

The amino acid unit Aa may contain four amino acids, which may be the same or different. They are all independently selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine(trityl)-, -lysine(monomethoxytrityl)-, and -lysine(fluorenylmethoxycarbonyl)-; preferably, the amino acid is selected from the group consisting of -valine-, -citrulline-, -alanine-, -lysine-, -lysine(trityl)-, -lysine(monomethoxytrityl)-, -lysine(fluorenylmethoxycarbonyl)-, -arginine-, -phenylalanine-, -glycine-, -leucine-, and -isoleucine-; n is an integer selected from 0 and 1, and when n is 0, $AA_4$ is directly covalently linked to $D_2$.

In some preferred embodiments, the amino acid unit Aa is selected from the group consisting of -valine-citrulline- (-Val-Cit-), -valine-alanine- (-Val-Ala-), -valine-lysine- (-Val-Lys-), -valine-lysine(trityl)- (-Val-Lys(Trt)-), -valine-lysine(monomethoxytrityl)- (-Val-Lys(Mmt)-), -valine-lysine(fluorenylmethoxycarbonyl)- (-Val-Lys(Fmoc)-), -valine-arginine- (-Val-Arg-), -phenylalanine-citrulline- (-Phe-Cit-), -phenylalanine-lysine-(-Phe-Lys-), -phenylalanine-lysine(trityl)- (-Phe-Lys(Trt)-), -phenylalanine- lysine (monomethoxytrityl)- (-Phe-Lys(Mmt)-), -phenylalanine-lysine(fluorenylmethoxycarbonyl)- (-Phe-Lys(Fmoc)-), -leucine-citrulline- (-Leu-Cit-), -isoleucine-citrulline- (-Ile-Cit-), and -phenylalanine-arginine- (-Phe-Arg-);

In other preferred embodiments, the amino acid unit Aa is -phenylalanine-arginine-arginine- (-Ala-Arg-Arg-);

In some preferred embodiments, the amino acid unit Aa is selected from the group consisting of -glycine-glycine-phenylalanine-glycine- (-Gly-Gly-Phe-Gly-), -glycine-phenylalanine-leucine-glycine- (-Gly-Phe-Leu-Gly-), and -alanine-leucine-alanine-leucine (-Ala-Leu-Ala-Leu-).

Optionally, the structure of the amino acid unit Aa can be selected from the following:

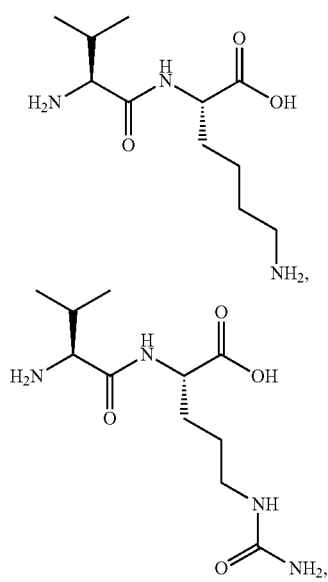

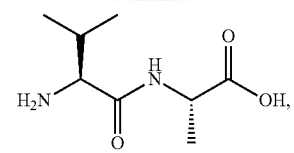

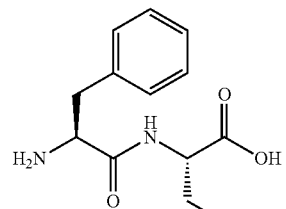

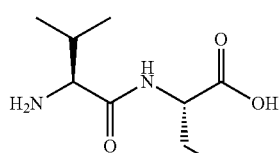

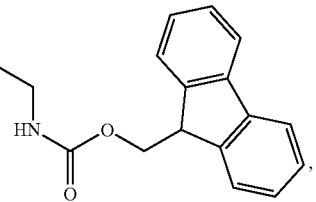

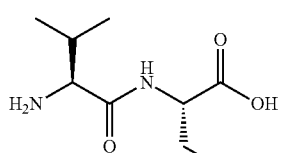

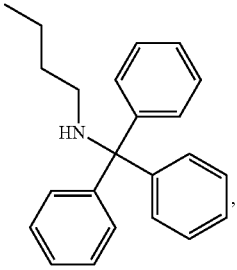

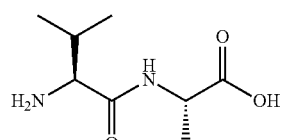

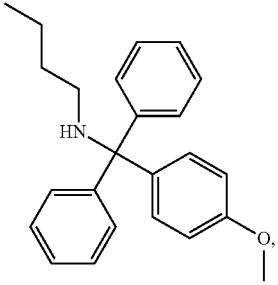

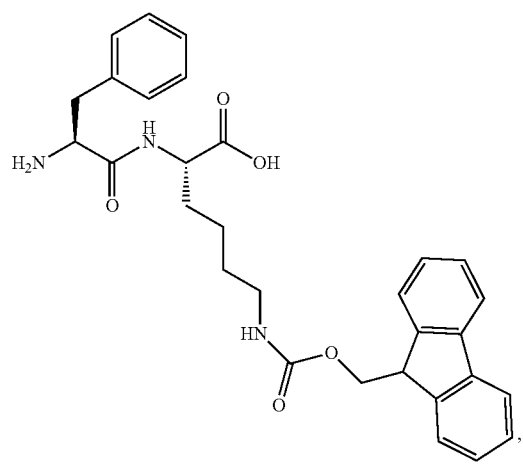
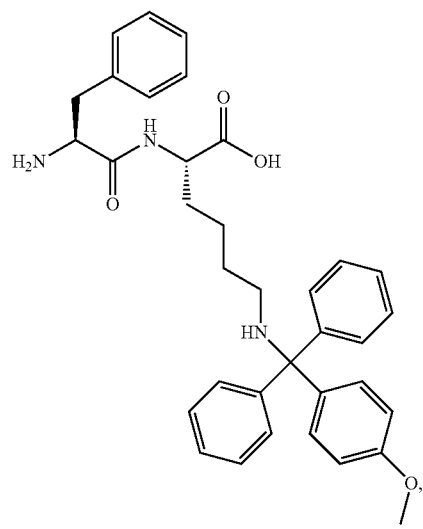
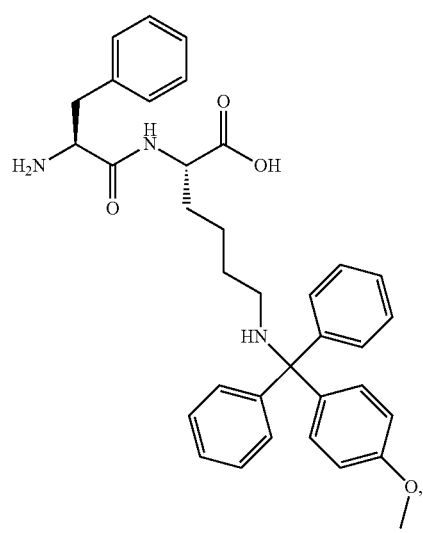
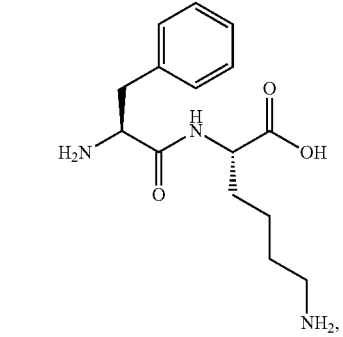
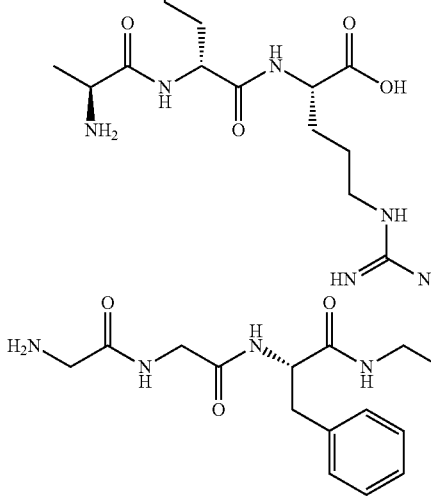
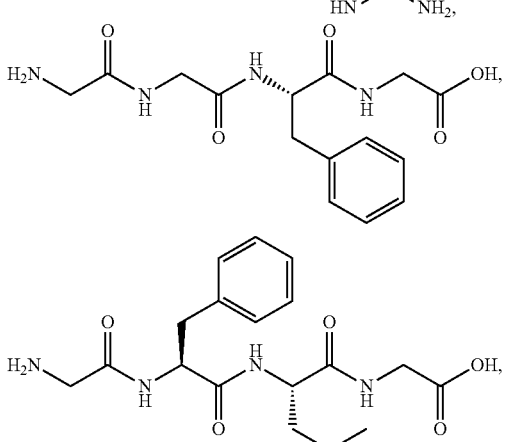
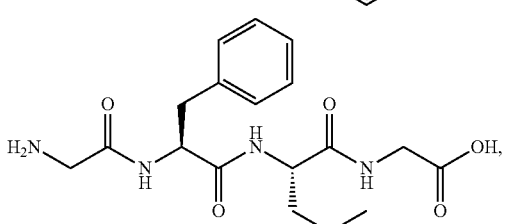
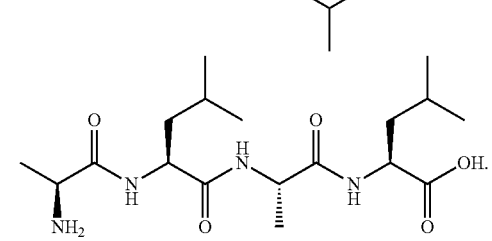
In some particular embodiments, the self-cracking unit G is null or selected from the following structures:
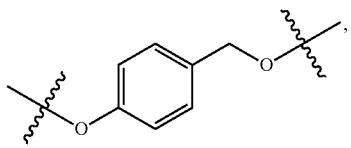

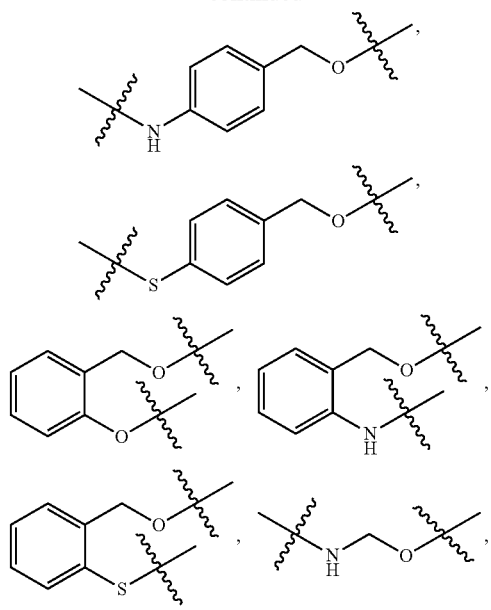

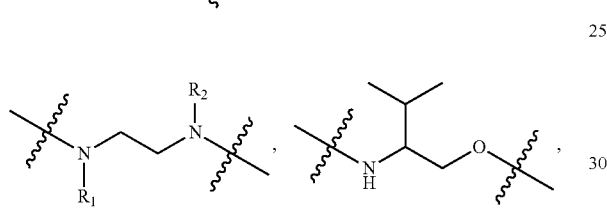

wherein the R1 and R2 are any substituent groups; preferably, the R1 and R2 are independently selected from H, $C_1$-$C_{10}$ alkyl and

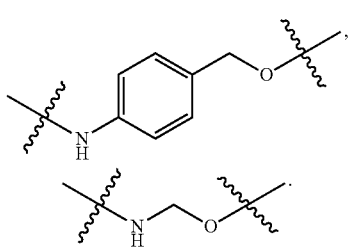

When the self-cracking unit G is null, the last amino acid group in the amino acid unit Aa which is covalently linked to the second active drug unit $D_2$.

Optionally, the self-cracking unit G is selected from the following structures:

In some particular embodiments, the compound is selected from the following structures:

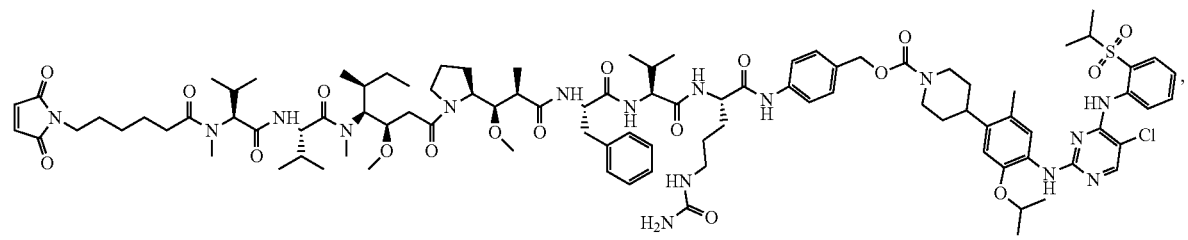

LD-1:Mc-MMAF-VC-Ceritinib

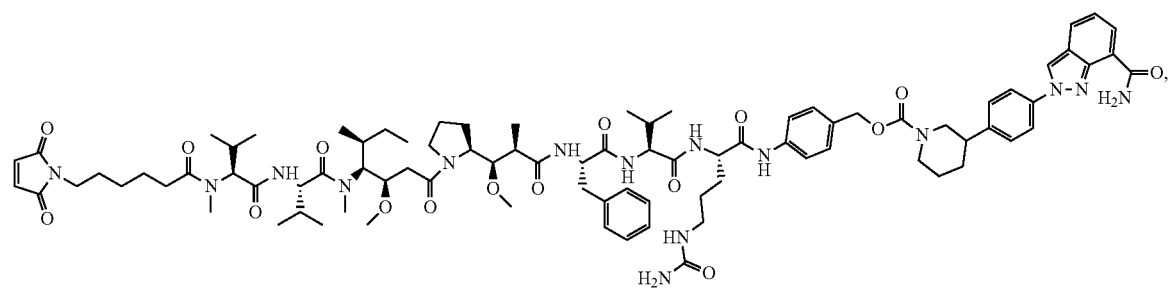

LD-2:Mc-MMAF-VC-PAB-MK4827

-continued

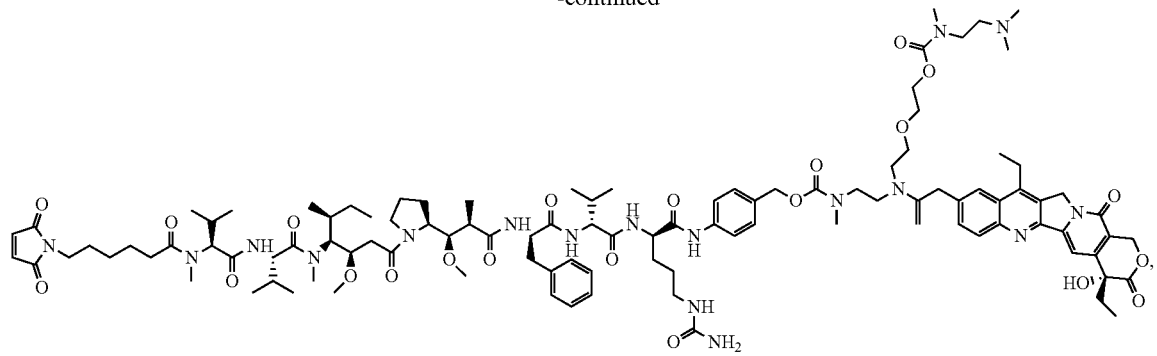

LD-3:Mc-MMAF-VC-PAB-DMEDA-PEG(N3)-SN38

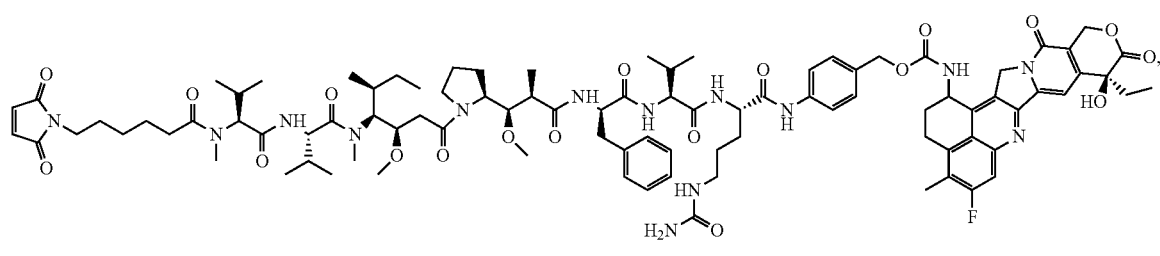

LD-4:Mc-MMAF-VC-PAB-Exatecan

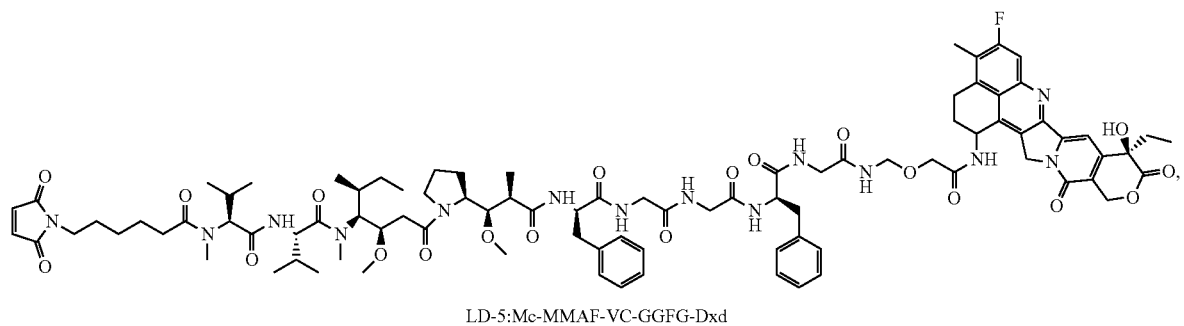

LD-5:Mc-MMAF-VC-GGFG-Dxd

The present disclosure also provides use of the compound of any one of the foregoing in the manufacture of a medicament for the treatment or prevention of a cancer, infectious disease or autoimmune disease.

The present disclosure also provides a method of synthesizing the above-mentioned intermediate compound, wherein the synthetic route of the method is:

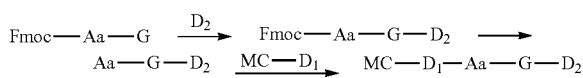

The synthetic method comprises the following steps:

Step 1: Dissolving compound Fmoc-Aa-G, the second active drug unit $D_2$, and organic base 1 in an appropriate amount of an organic solvent 1, and allowing them to contact and react to obtain a compound Fmoc-Aa-G-$D_2$;

Step 2: Removing the protection group Fmoc from the compound Fmoc-Aa-G-$D_2$ to obtain a compound Aa-G-$D_2$;

Step 3: Dissolving the compound Aa-G-$D_2$, a compound Mc-$D_1$, and condensing agent 1 in an appropriate amount of an organic solvent 2, and allowing them to contact and react to obtain a compound Mc-$D_1$-Aa-G-$D_2$;

wherein, the organic base 1 is selected from one or more of N,N-diisopropylethylamine, triethylamine, and pyridine; the organic solvent 1 and the organic solvent 2 are each independently selected from one or both of DMF and DMA; the condensing agent 1 is selected from one or more of TSTU, HATU, HBTU, HCTU, PyBop, CDMT, and T3P.

In some specific embodiments, the present disclosure also provides use of the above-provided synthetic method, wherein the synthetic method is used for a synthetic route for preparing a specific intermediate compound, and the synthetic route is selected from the following:

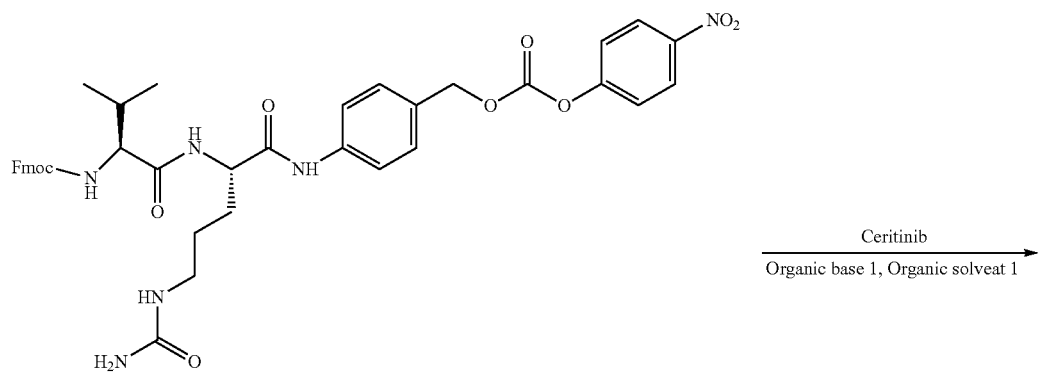
Fmoc-VC-PAB-PNP
→ Ceritinib / Organic base 1, Organic solveat 1
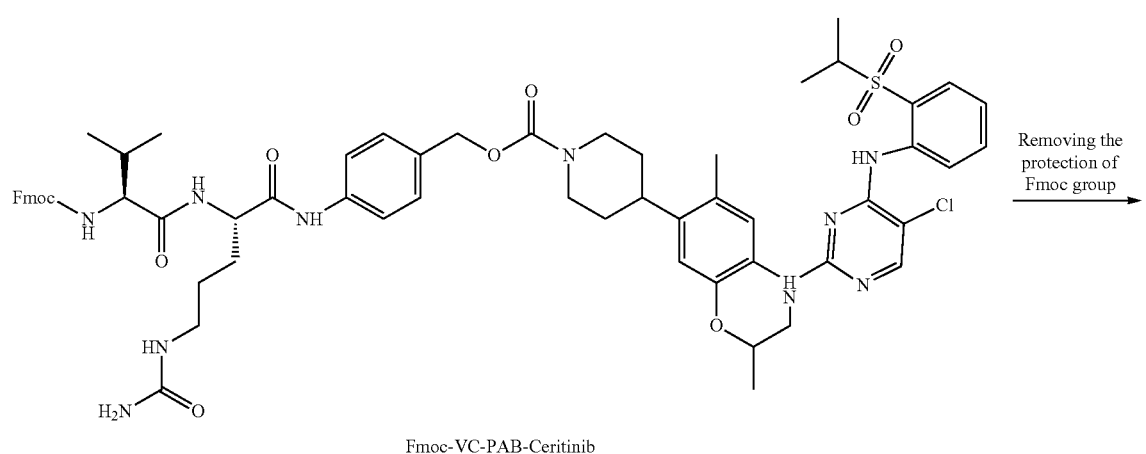
Fmoc-VC-PAB-Ceritinib
→ Removing the protection of Fmoc group
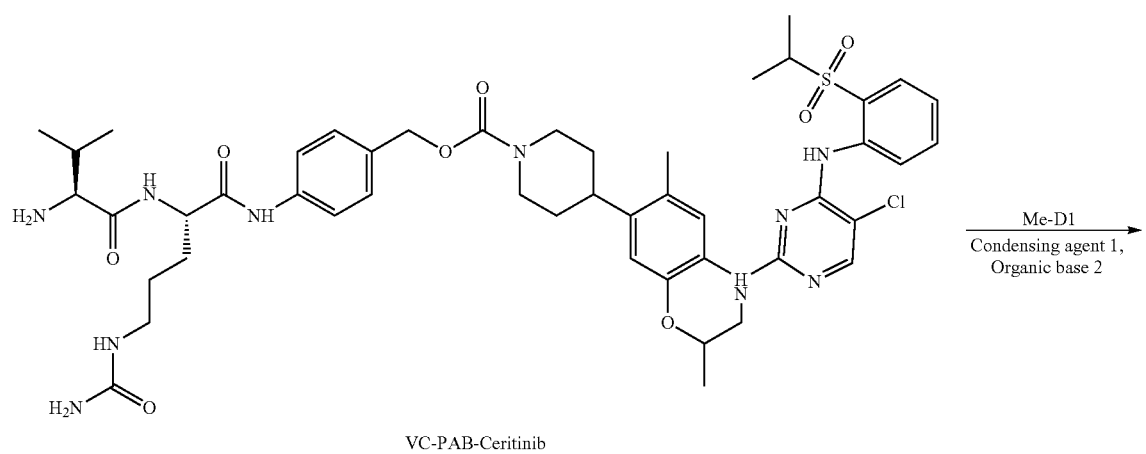
VC-PAB-Ceritinib
→ Me-D1 / Condensing agent 1, Organic base 2
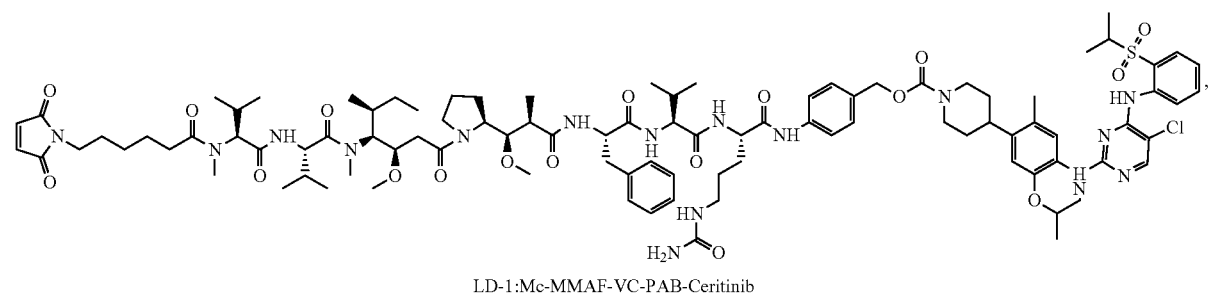
LD-1:Mc-MMAF-VC-PAB-Ceritinib

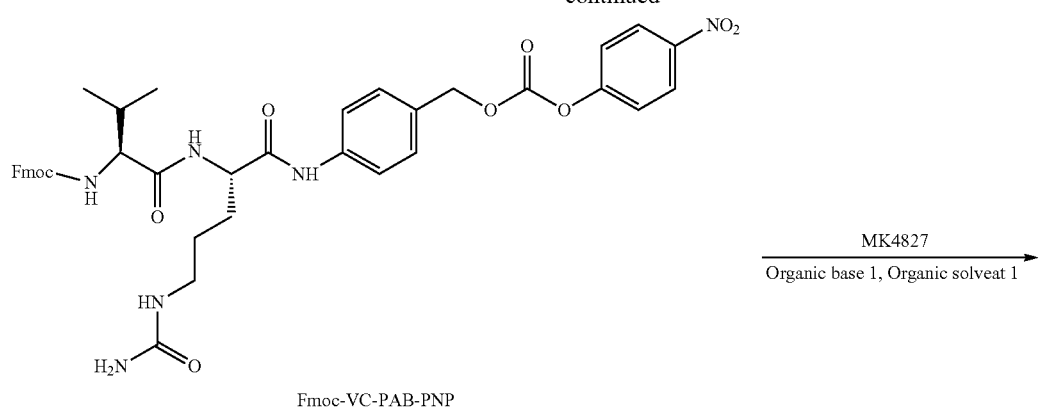
Fmoc-VC-PAB-PNP
→ MK4827
Organic base 1, Organic solvent 1
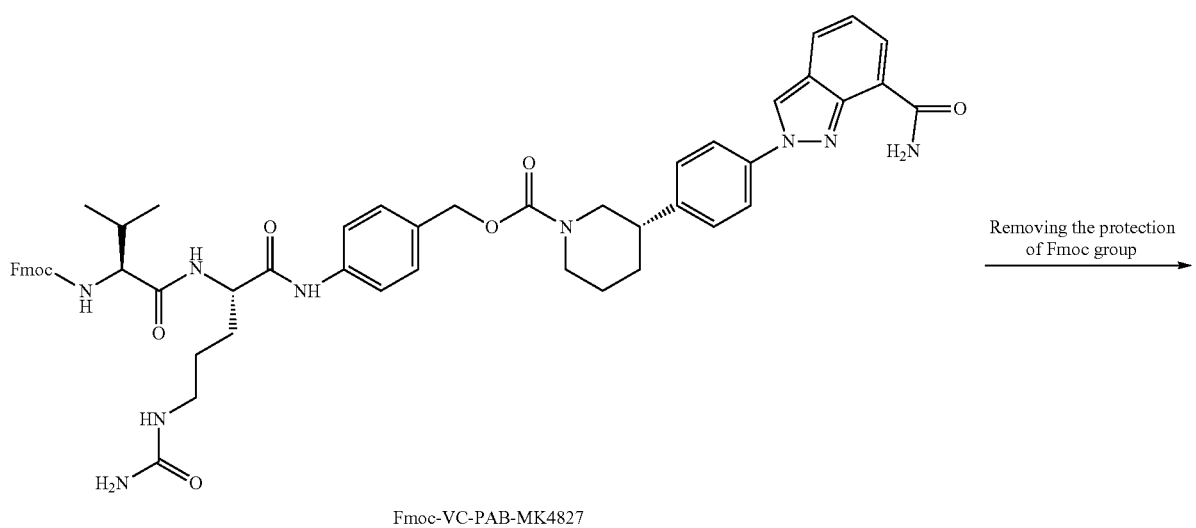
Fmoc-VC-PAB-MK4827
→ Removing the protection of Fmoc group
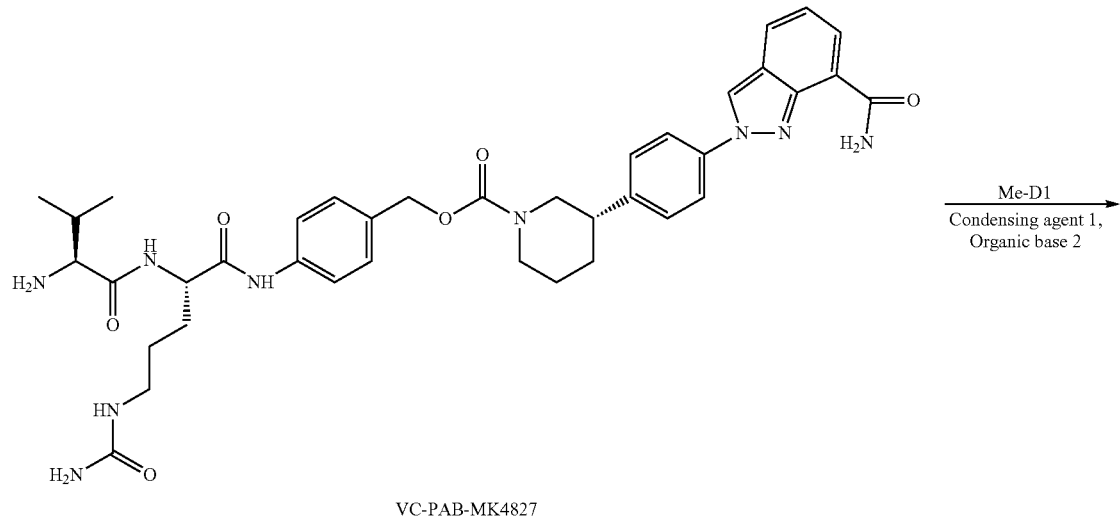
VC-PAB-MK4827
→ Me-D1
Condensing agent 1, Organic base 2

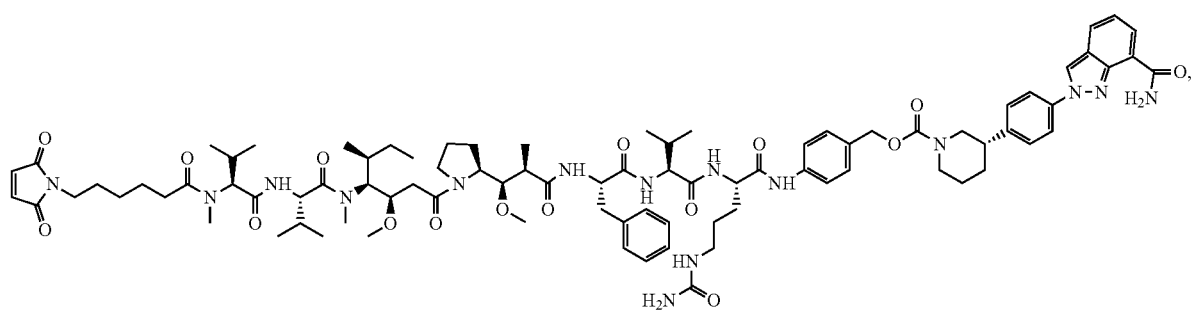
LD-2:Mc-MMAF-VC-PAB-MK4827
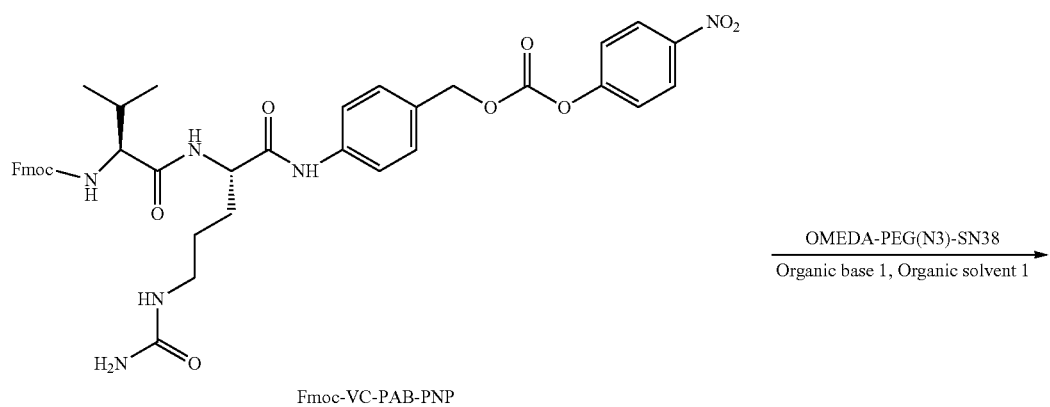
Fmoc-VC-PAB-PNP
$\xrightarrow{\text{OMEDA-PEG(N3)-SN38}}{\text{Organic base 1, Organic solvent 1}}$
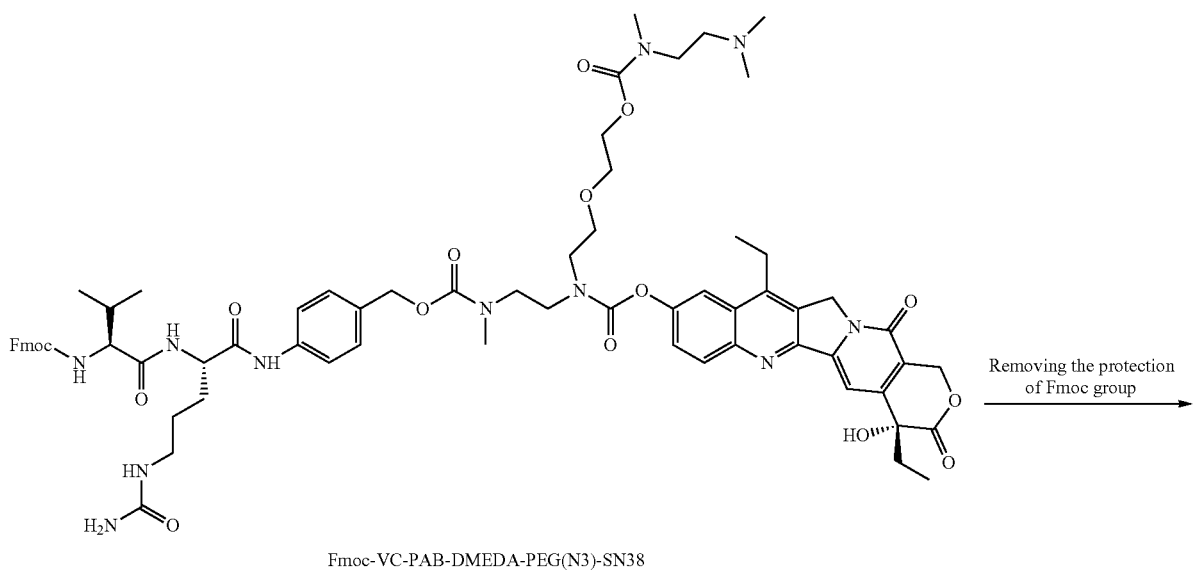
Fmoc-VC-PAB-DMEDA-PEG(N3)-SN38
$\xrightarrow{\text{Removing the protection of Fmoc group}}$ -continued
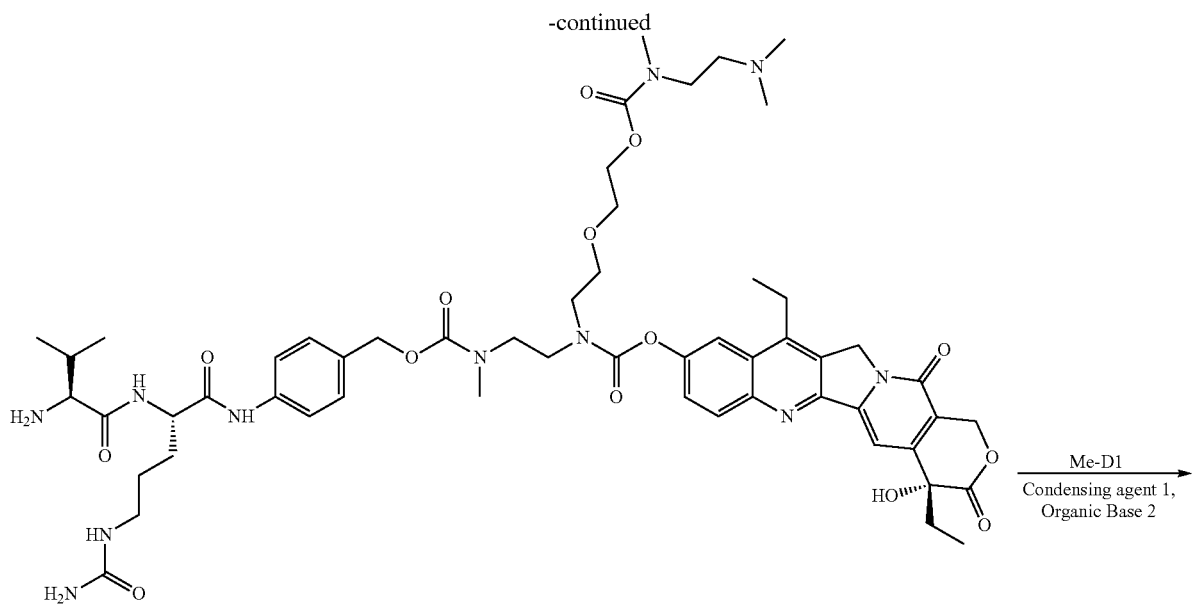
VC-PAB-DMEDA-PEG(N3)-SN38
→ Me-D1
Condensing agent 1,
Organic Base 2
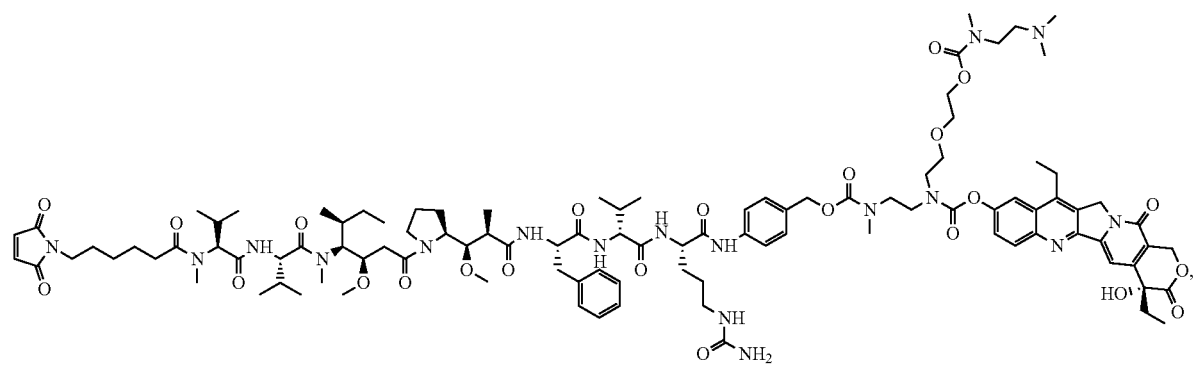
LD-3:Mc-MMAF-VC-PAB-DMEDA-PEG(N3)-SN38
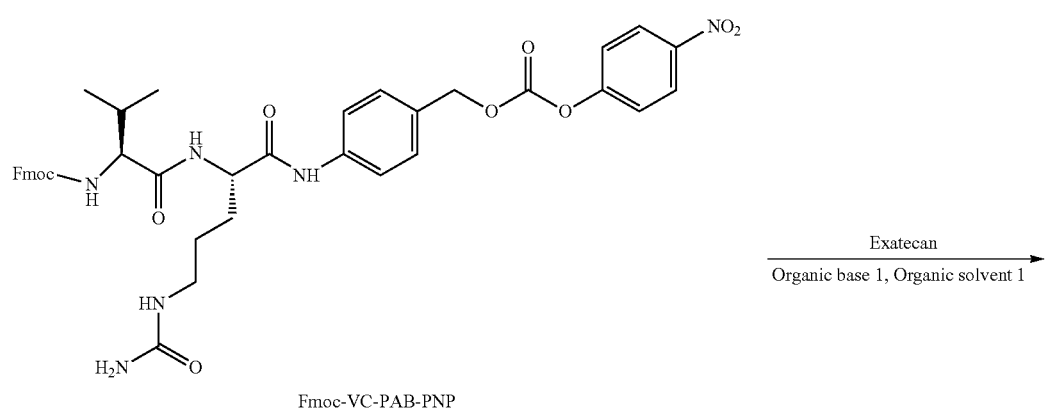
Fmoc-VC-PAB-PNP
→ Exatecan
Organic base 1, Organic solvent 1

-continued
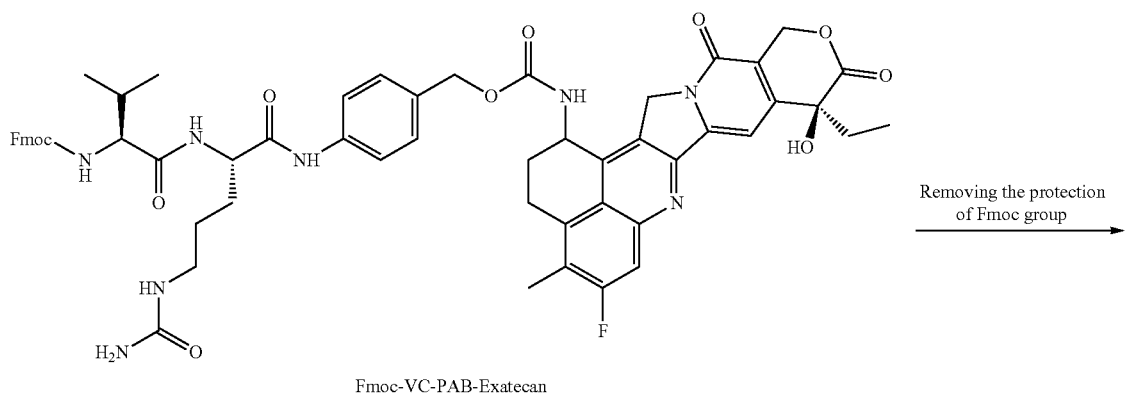
Fmoc-VC-PAB-Exatecan
→ Removing the protection of Fmoc group
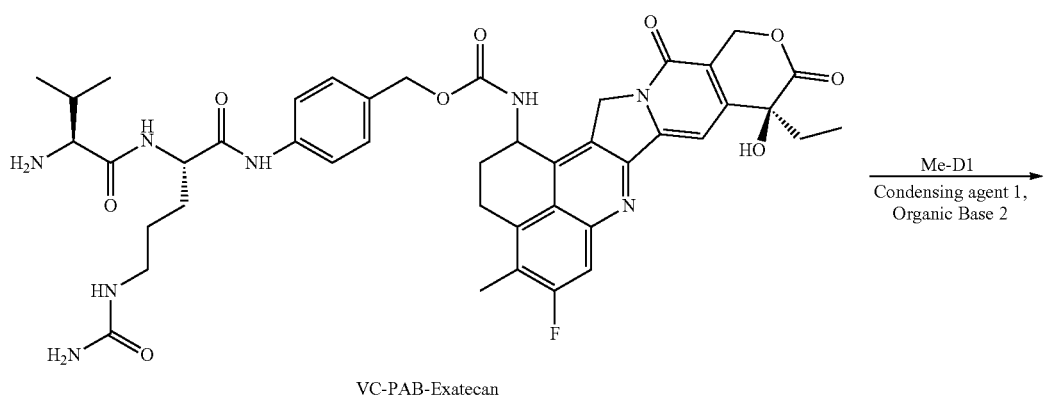
VC-PAB-Exatecan
→ Me-D1
Condensing agent 1, Organic Base 2
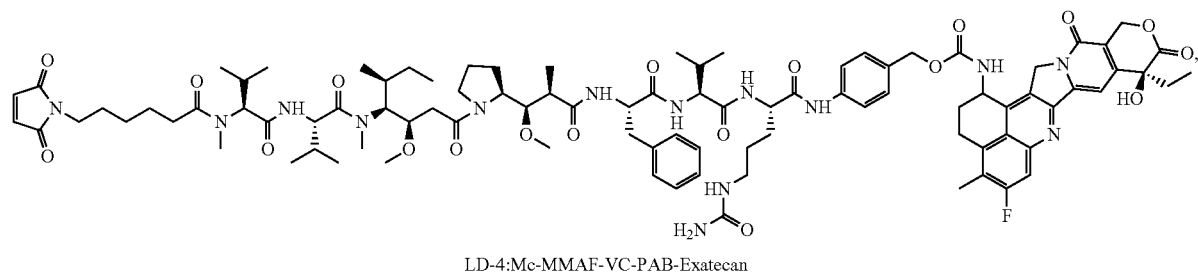
LD-4:Mc-MMAF-VC-PAB-Exatecan
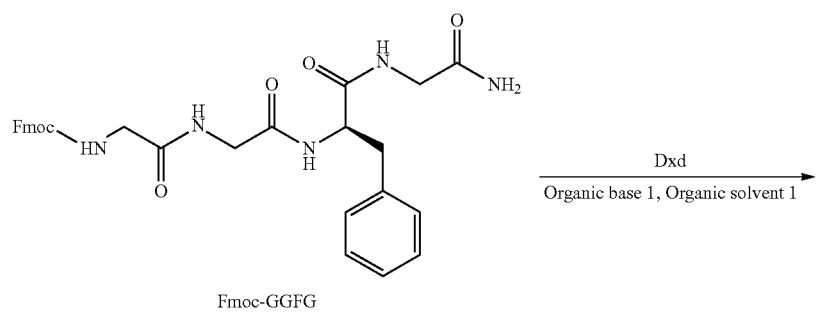
Fmoc-GGFG
→ Dxd
Organic base 1, Organic solvent 1

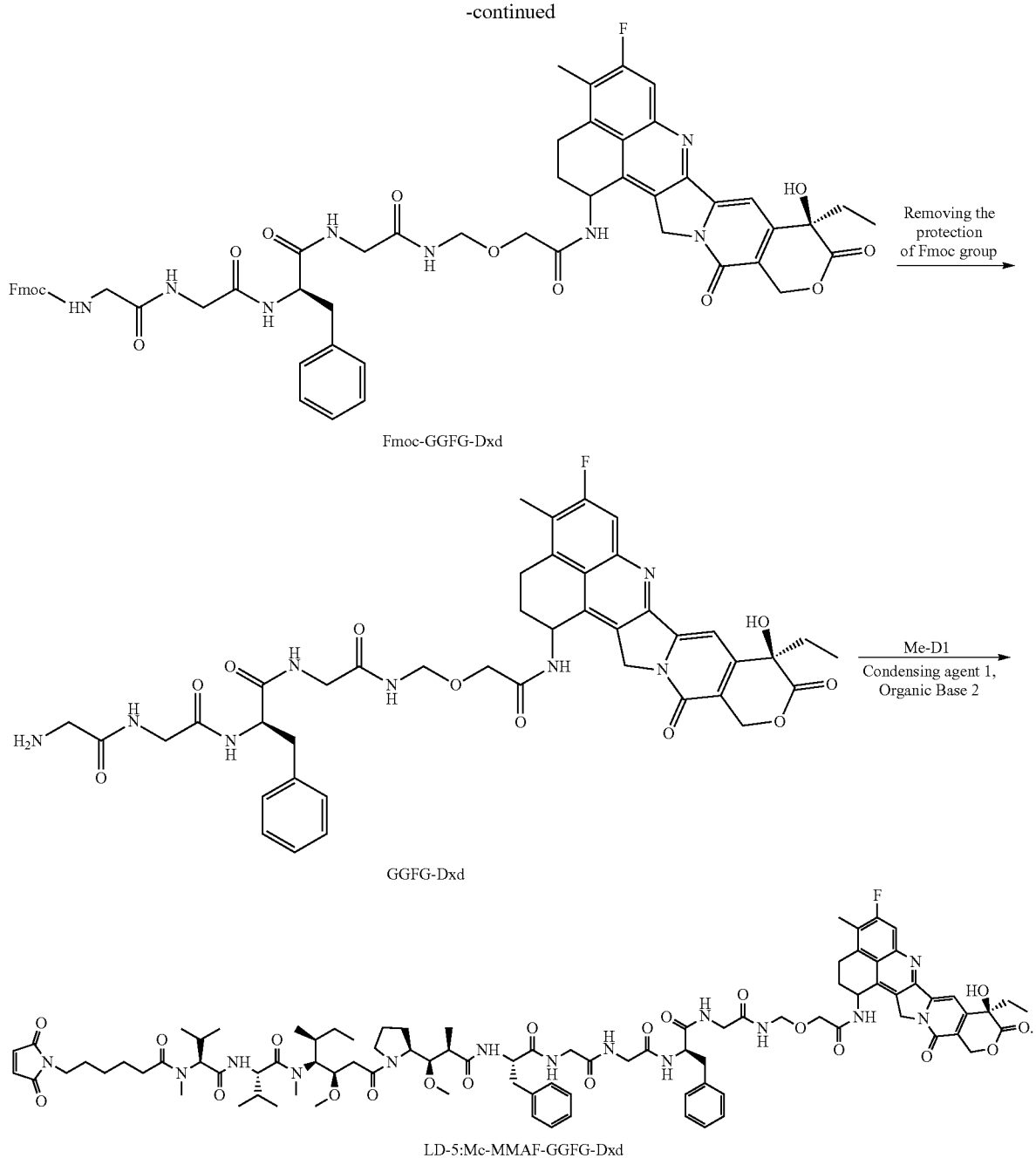

The present disclosure surprisingly found that by connecting MMAF and another drug unit in series at a cysteine binding site on the antibody via a linker the two can exert a significant synergistic effect, thereby effectively improving the effect of killing tumor cells. This provides a new solution for the development of high-efficiency and low-toxic ADCs.

DETAILED DESCRIPTION

Definition

Unless otherwise defined, all technical and scientific terms used herein are consistent with the common understanding of those of ordinary skill in the art to which the present disclosure relates. Although any methods and materials similar or equivalent to those described herein can also be employed in the practice or testing of the present disclosure, the preferred methods and materials are described herein. When describing and claiming the present disclosure, the following terms are used in accordance with the following definitions.

When a trade name is used in the present disclosure, the applicant intends to include the formulation, the generic drug and the active drug ingredient of the product with the trade name.

Unless stated to the contrary, the terms used in the specification and the claims have the same meaning as follows.

The term "antibody-drug conjugate (ADC)" used in the present disclosure refers to a compound in which an antibody or antigen-binding fragment, linking unit, and active drug unit are linked together through a chemical reaction, and the structure usually consists of three parts: an antibody or antibody-like ligand, drug part (i.e. active drug unit), and a linker that couples the antibody or antibody-like ligand to the drug part.

The term "antibody" used in the present disclosure refers to a macromolecular compound that can recognize and bind to an antigen or receptor associated with a target cell. The effect of an antibody is to present the drug to the target cell population to which the antibody binds. These antibodies include but are not limited to protein hormones, lectins, growth factors, antibodies or other molecules that can bind to cells. In some particular embodiments, the antigen to which the antibody binds to includes but is not limited to: carbonic anhydrase IX, B7, CCCL19, CCCL21, CSAp, HER-2/neu, BrE3, CD1, CD1a, CD2, CD3, CD4, CD5, CD8, CD11A, CD14, CD15, CD16, CD18, CD19, CD20, CD21, CD22, CD23, CD25, CD29, CD30, CD32b, CD33, CD37, CD38, CD40, CD40L, CD44, CD45, CD46, CD52, CD54, CD55, CD59, CD64, CD67, CD70, CD74, CD79a, CD80, CD83, CD95, CD126, CD133, CD138, CD147, CD154, CEACAM5, CEACAM-6, alpha-fetoprotein (AFP), VEGF, ED-B fibronectin, EGP-1, EGP-2, EGF receptor (ErbB1), ErbB2, ErbB3, factor H, FHL-1, Flt-3, folate receptor, Ga 733, GROB, HMGB-1, hypoxia-inducible factor (HIF), HM1.24, HER-2/neu, insulin-like growth factor (ILGF), IFN-γ, IFN-α, IFN-β, IL-2R, IL-4R, IL-6R, IL-13R, IL-15R, IL-17R, IL-18R, IL-2, IL-6, IL-8, IL-12, IL-15, IL-17, IL-18, IL-25, IP-10, IGF-1R, Ia, HM1.24, ganglioside, HCG, HLA-DR, CD66a-d, MAGE, McRP, McP-1, MIP-1A, MIP-1B, macrophage migration inhibitory factor (MIF), MUC1, MUC2, MUC3, MUC4, MUC5, placental growth factor (PlGF), PSA (prostate specific antigen), PSMA, PSMA dimer, PAM4 antigen, NCA-95, NCA-90, A3, A33, Ep-CAM, KS-1, Le(y), mesothelin, S100, tenascin, TAC, Tn antigen, Thomas-Friedenreich antigen, tumor necrosis antigen, tumor angiogenesis antigen, TNF-α, TRAIL receptor (R1 and R2), VEGFR, RANTES, T101, cancer stem cell antigen, complement factor C3, C3a, C3b, C5a, C5, and oncogene products. In some particular embodiments, the antibody includes but is not limited to: anti-EGFRvIII antibody, anti-DLL-3 antibody, anti-PSMA antibody, anti-CD70 antibody, anti-MUC16 antibody, anti-ENPP3 antibody, anti-TDGF1 antibody, anti-ETBR antibody, anti-MSLN antibody, anti-TIM-1 antibody, anti-LRRC15 antibody, anti-LIV-1 antibody, anti-CanAg/AFP antibody, anti-cladin 18.2 antibody, anti-mesothelin antibody, anti-HER2 (ErbB2) antibody, anti-EGFR antibody, anti-c-MET antibody, anti-SLITRK6 antibody, anti-KIT/CD117 antibody, anti-STEAP1 antibody, anti-SLAMF7/CS1 antibody, anti-NaPi2B/SLC34A2 antibody, anti-GPNMB antibody, anti-HER3 (ErbB3) antibody, anti-MUC1/CD227 antibody, anti-AXL antibody, anti-CD166 antibody, anti-B7-H3 (CD276) antibody, anti-PTK7/CCK4 antibody, anti-PRLR antibody, anti-EFNA4 antibody, anti-5T4 antibody, anti-NOTCH3 antibody, anti-Nectin 4 antibody, anti-TROP-2 antibody, anti-CD142 antibody, anti-CA6 antibody, anti-GPR20 antibody, anti-CD174 antibody, anti-CD71 antibody, anti-EphA2 antibody, anti-LYPD3 antibody, anti-FGFR2 antibody, anti-FGFR3 antibody, anti-FRα antibody, anti-CEACAMs antibody, anti-GCC antibody, anti-Integrin Av antibody, anti-CAIX antibody, anti-P-cadherin antibody, anti-GD3 antibody, anti-Cadherin 6 antibody, anti-LAMP1 antibody, anti-FLT3 antibody, anti-BCMA antibody, anti-CD79b antibody, anti-CD19 antibody, anti-CD33 antibody, anti-CD56 antibody, anti-CD74 antibody, anti-CD22 antibody, anti-CD30 antibody, anti-CD37 antibody, anti-CD138 antibody, anti-CD352 antibody, anti-CD25 antibody or anti-CD123 antibody and newly discovered target antibodies.

The antibody of the present disclosure includes a murine antibody, a chimeric antibody, a primate antibody, a humanized antibody, and a fully human antibody, preferably a humanized antibody and a full human antibody.

The term "murine antibody" in the present disclosure refers to an antibody prepared with murine animals based on knowledge and skills in the art. During preparation, injecting the test subject with a specific antigen, and then separating the hybrids expressing antibodies with the desired sequence or functional properties.

The term "chimeric antibody" is an antibody formed by fusing the variable region of a murine antibody with the constant region of a human antibody, which can reduce the immune response induced by the murine antibody. To establish a chimeric antibody, it is necessary to first establish a hybridoma secreting murine specific monoclonal antibodies, then clone the genes in the variable region from the murine hybridoma cells, then clone the genes in the constant region of the human antibody as needed, and then link the murine variable region gene and the human constant region gene together to generate a chimeric gene in order to insert into an expression vector, and finally the chimeric antibody molecule is expressed in a eukaryotic system or a prokaryotic system.

The term "humanized antibody", also called CDR-grafted antibody, refers to an antibody produced by transplanting murine CDR sequences into variable region frameworks of human antibody sequences, i.e., different types of human germline antibody frameworks sequences, which can overcome the heterogeneous reaction induced by chimeric antibodies due to a large amount of murine protein components they carry. Such framework sequences can be obtained from public DNA databases or published references that include germline antibody gene sequences. For example, the germline DNA sequences of human heavy chain and light chain variable region genes can be found in the "VBase" human germline sequence database, (available on the world-wide-web_at_mrccpe.com/ac.uk/vbase) as well as in Kabat, E A, et al., 1991, Sequences of Proteins of Immunological Interest, 5th edition. In order to avoid the decrease of the resulting activity along with the decrease of the immunogenicity, the variable region framework sequence of the human antibody can be subjected to minimal reverse mutations or back mutations to maintain the activity. The humanized antibody of the present disclosure also includes a humanized antibody that is further subjected to affinity maturation for CDR by phage display. Documents that further describe methods of using mouse antibodies involved in humanization include, for example, Queen et al., Proc., Natl. Acad. Sci. USA, 88, 2869, 1991 and the method of Winter et al. [Jones., Nature, 321,522, (1986)], Riechmann, et al. [Nature, 332, 323-327, 1988), Verhoeyen, et al., Science, 239, 1534 (1988)].

The term "fully humanized antibody", "full human antibody", "intact humanized antibody" or "human antibody", also known as "full human monoclonal antibody", refers to an antibody whose variable regions and constant regions are both of human origin, with immunogenicity and toxic side effects removed. The development of monoclonal antibodies has gone through four stages, namely: murine monoclonal antibodies, chimeric monoclonal antibodies, humanized monoclonal antibodies and full human monoclonal antibodies. The present disclosure adopts the fully human monoclonal antibody. The related technologies for the preparation of full human antibodies mainly include: human hybridoma technology, EBV transformed B lymphocyte technology, phage display technology, transgenic mouse antibody preparation technology and single B cell antibody preparation technology.

The term "antigen-binding fragment" as used in the present disclosure refers to one or more fragments of an antibody that maintain the ability to specifically bind to an antigen. Examples of binding fragments contained in the "antigen-binding fragment" include (i) Fab fragment, which is a monovalent fragment consisting of VL, VH, CL and CH1 domains; (ii) F(ab')$_2$ fragment, which is a bivalent fragment comprising two Fab fragments linked by a disulfide bridge in the hinge region, (iii) Fd fragment, consisting of VH and CH1 domains; (iv) Fv fragment, consisting of VH and VL domains of one arm of the antibody; (v) a single domain or dAb fragment (Ward et al., (1989) Nature 341: 544-546), consisting of a VH domain; (vi) an isolated complementarity determining region (CDR); and (vii) a combination of two or more isolated CDRs that can optionally be linked by a synthetic linker. In addition, although the two domains VL and VH of Fv fragment are encoded by separate genes, they can be linked through a synthetic linker using recombination methods so that the Fv fragment can be produced as a single protein chain in which the VL and VH regions pair to form a monovalent molecule (referred to as single-chain Fv (scFv); see, for example, Bird et al. (1988) Science 242:423-426 and Huston et al. (1988) Proc. NatL. Acad. Sci. USA 85: 5879-5883). Such single chain antibodies are also intended to be included in the term "antigen-binding fragment" of antibodies. Such antibody fragments are obtained using conventional techniques known to those skilled in the art, and screened for utility in the same manner as for intact antibodies. The antigen-binding fragment can be produced by recombinant DNA technology or by enzymatic or chemical fragmentation of the intact immunoglobulin. The antibodies may be antibodies of different isotypes, for example, IgG (e.g., IgG1, IgG2, IgG3 or IgG4 subtype), IgA1, IgA2, IgD, IgE or IgM antibodies.

The term Fab is an antibody fragment with a molecular weight of about 50,000 and antigen-binding activity among fragments obtained by treating an IgG antibody molecule with the protease papain (which cleaves the amino acid residue at position 224 of the H chain), wherein about half of the N-terminal side of the H chain and the entire L chain are linked together by a disulfide bond.

The term F(ab')$_2$ is an antibody fragment with a molecular weight of about 100,000 and antigen-binding activity and comprising two Fab regions linked together in the hinge region obtained by digesting the lower part of the two disulfide bonds in the hinge region of IgG with the enzyme pepsin.

The term Fab' is an antibody fragment with a molecular weight of about 50,000 and antigen-binding activity obtained by cleaving the disulfide bond of the hinge region of the above F(ab')$_2$. In addition, Fab' can be produced by inserting DNA encoding the Fab' fragment of the antibody into a prokaryotic expression vector or eukaryotic expression vector and then introducing the vector into a prokaryotic organism or eukaryotic organism to express Fab'.

The term "single-chain construct", including but not limited to "single-chain antibody", "single-chain Fv" and "scFv", means a molecule comprising the variable domain or region of the antibody heavy chain (i.e., VH) linked to the variable domain or region of the antibody light chain (i.e., VL) through a linker. Such scFv molecules may have the general structure of NH$_2$-VL-linker-VH—COOH or NH$_2$—VH-linker-VL-COOH. A suitable linker in prior art comprises a repeated GGGGS amino acid sequence or a variant thereof, for example using 1-4 repeated variants (Holliger et al. (1993), proc. Natl. Acad. Sci. USA 90: 6444-6448). Other linkers that can be used in the present disclosure are described by Alfthan et al. (1995), Protein Eng. 8: 725-731; Choi et al. (2001), Eur. J. Immunol. 1.31: 94-106; Hu et al. (1996), Cancer Res. 56: 3055-3061; Kipriyanov et al. (1999), J. Mol. Biol. 293:41-56 and Roovers et al. (2001), Cancer Immunol.

Techniques for preparing antibodies or antigen-binding fragments thereof against virtually any target antigen are well known in the art. For example, see Kohler and Milstein, Nature 256:495 (1975), and Coligan et al. (eds.), CURRENT PROTOCOLS IN IMMUNOLOGY, Vol. 1, pages 2.5.1-2.6.7 (John Wiley & Sons, 1991). Briefly, monoclonal antibodies can be obtained as follows: injecting mice with a composition comprising an antigen, and taking out the spleen to obtain B lymphocytes, which are then fused with myeloma cells to produce hybridomas, then cloning the hybridomas, selecting the positive clones that produce the antibody against the antigen, culturing the clones that produce the antibody against the antigen, and isolating the antibody from the hybridoma culture. Antibodies can be isolated and purified from hybridoma cultures by many well-established techniques. Such isolation techniques include protein A or protein G sepharose affinity chromatography, size exclusion chromatography, and ion exchange chromatography. For example, see Coligan pages 2.7.1-2.7.12 and pages 2.9.1-2.9.3. See also Baines et al., "Purification of Immunoglobulin G (IgG)" in Methods IN MOLECULAR BIOLOGY, Volume 10, Page 79-104 (The Humana Press, Inc. 1992). After the initial elicitation of antibodies against the immunogen, the antibodies can be sequenced and subsequently prepared by recombinant technology. The humanization and chimerization of murine antibodies and antibody fragments are well known to those skilled in the art.

The term "linking unit" refers to a chemical structural fragment or bond that links one end to the antibody/antigen-binding fragment and at the other end to the drug, thus acting as a "bridge" to link the antibody/antigen-binding fragment to the drug molecule. It can include a linker, a spacer and an amino acid unit, and can be synthesized by methods known in the art, such as those described in US2005-0238649A1. As used herein, "linking unit" can be divided into two categories: non-cleavable linkers and cleavable linkers.

The non-cleavable linker is a relatively stable linker whose structure is difficult to be degraded or broken in vivo. For an antibody-drug conjugate containing a non-cleavable linker, the drug release mechanism is: the conjugate binds to the antigen and then is taken by endocytosis; the antibody is hydrolyzed in the lysosome, and an active molecule composed of the drug, the linker, and amino acid residues of the antibody is released. The resulting change in the structure of the drug does not diminish the cytotoxicity of the drug. However, since the active molecule is charged (due to the amino acid residues), it cannot penetrate into adjacent cells. Therefore, such active drugs cannot kill adjacent tumor cells which do not express the target antigen (antigen-negative cells) (bystander effect) (Bioconjugate Chem. 2010, 21, 5-13). Common linkers such as Mc linker and Mcc linker are shown in the following structure.

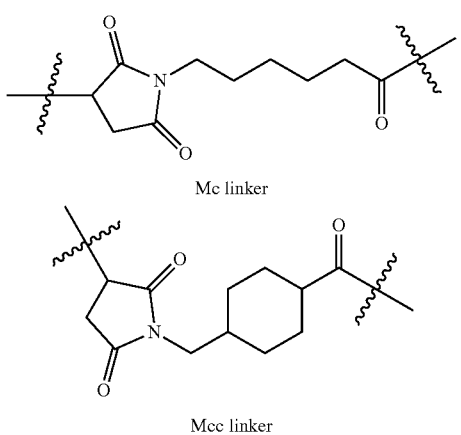

Mc linker

Mcc linker

A cleavable linker, as the name implies, may be cleaved in the target cells and release the active drug (the small molecule drug itself). A cleavable linker may be divided into two main classes: chemically labile linker and enzyme-labile linker.

A chemically labile linker may be selectively cleaved due to different plasma and cytoplasmic properties. Such properties include pH, glutathione concentration, and the like.

A pH-sensitive linker is often referred to as an acid-labile linker. Such a linker is relatively stable in the neutral environment of blood (pH 7.3-7.5), but will be hydrolyzed in slightly acidic endosomes (pH 5.0-6.5) and lysosomes (pH 4.5-5.0). Most of the first generation of antibody-drug conjugates used this type of linker, such as hydrazone, carbonate, acetal, ketals. Antibody-drug conjugates using this type of linker typically have a shorter half-life (2-3 days) due to the limited stability of the acid-labile linker in plasma. This short half-life limits the use of the pH-sensitive linker in new generation of antibody-drug conjugates to some extent.

A glutathione-sensitive linker is also known as a disulfide linker. Drug release is caused by the difference between the high concentration (in millimolar range) of intracellular glutathione and the relatively low concentration of glutathione (micromolar range) in the blood. This is especially the case for tumor cells, in which low oxygen content result in enhanced reductase activity, thus resulting in higher glutathione concentration. Disulfide bond is thermodynamically stable and therefore has better stability in plasma.

An enzyme-labile linker, such as a peptide linker, is capable of controlling drug release better. The peptide linker is capable of being efficiently cleaved by a protease in lysosomes such as Cathepsin B or plasmin (the content of such enzyme is increased in some tumor tissues). This peptide linkage is believed to be very stable in the plasma circulation, because the extracellular inappropriate pH and serum protease inhibitors generally make the protease to be inactivated outside the cell. In view of the high plasma stability and good intracellular cleavage selectivity and effectiveness, enzyme-labile linkers are widely used as cleavable linkers for antibody-drug conjugates.

A suicide linker is typically chimeric between a cleavable linker and an active drug, or itself a part of the cleavable linker. The mechanism of the suicide linker is that when the cleavable linker is broken under suitable conditions, the suicide linker can spontaneously perform structure rearrangement to release the active drug linked thereto. Common suicide linkers are such as p-aminobenzyl alcohols (PABs).

The terms "toxin", "drug", "drug part" and "drug unit" used in the present disclosure generally refer to the same structure, and can be used under any name in the present disclosure. They broadly refer to any compound having desired biological activity and a reactive functional group for producing the conjugate of the present disclosure. Desired biological activity includes diagnosis, cure, alleviation, treatment, and prevention of diseases in humans or other animals. As new drugs are continuously discovered and developed, these new drugs should also be encompassed by the drugs described in the present invention. They can be any substance that can have harmful effects on the growth or proliferation of cells, and can be small molecule toxins and their derivatives from bacteria, fungi, plants or animals, including camptothecin derivatives such as Exatecan, maytansinoid and their derivatives (CN101573384) such as DM1, DM3 and DM4, auristatin F (AF) and their derivatives such as MMAF, MMAE and 3024 (WO 2016/127790A1), diphtheria toxin, exotoxin, ricin A chain, abrin A chain, modeccin, α-sarcin, Aleutites fordii toxic protein, dianthin toxic protein, *Phytolaca americana* toxic protein (PAPI, PAPII and PAP-S), *Momordica charantia* inhibitor, curcin, crotin, *Sapaonaria officinalis* inhibitor, gelonin, mitogellin, restrictocin, phenomycin, economycin, and trichothecenes.

The three-letter code and one-letter code of the term "amino acid" are as described in J. biol. Chem, 1968, 243, 3558. The term "amino acid" includes but not limited to "acidic amino acid", "natural amino acid", and "non-natural amino acid". "Acidic amino acid" refers to an amino acid whose isoelectric point is less than 7, and often contains one or more acidic groups such as carboxyl group, which can be effectively ionized into negative ions in the structure to increase hydrophilicity. Acidic amino acids can be natural or unnatural amino acids. "Natural amino acid" refers to an amino acid synthesized by organisms. Natural amino acids are generally L-type, but there are a few exceptions, such as glycine, including natural and biosynthetic. "Non-natural amino acid" refers to an amino acid obtained by synthetic means.

Most importantly, those skilled in the art will recognize that the compounds and methods claimed in the present disclosure can utilize any of a variety of antibodies known in the art. The antibodies used can be purchased from a variety of known sources or prepared by techniques known to those skilled in the art. In addition, the compounds and methods claimed in the present disclosure can utilize a variety of linking units known in the art, and the linking units used can be purchased from a variety of known sources or prepared by techniques known to those skilled in the art. Therefore, the choice of antibody and linking unit should not be considered as a limitation of the compounds and methods claimed in the present disclosure.

EXAMPLES
Example 1. Preparation of Compound L-D (i.e., Linking Group-Dual Toxin Group Compound)
(1) Preparation of Compound LD-1 (i.e., Mc-MMAF-VC-PAB-Ceritinib)
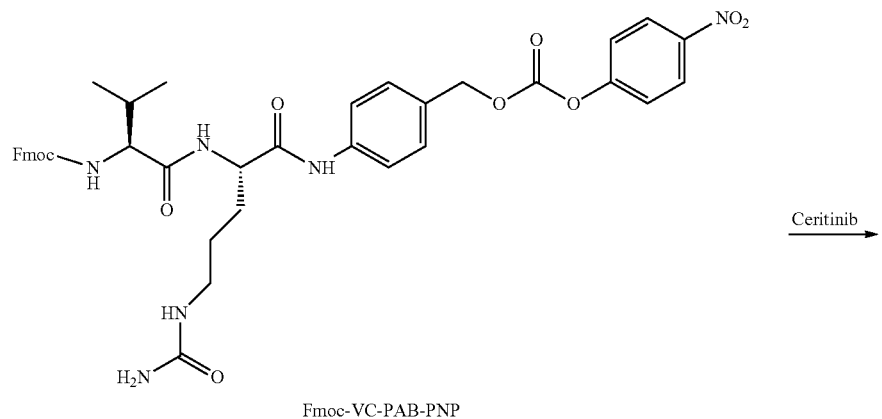
Fmoc-VC-PAB-PNP
→ Ceritinib
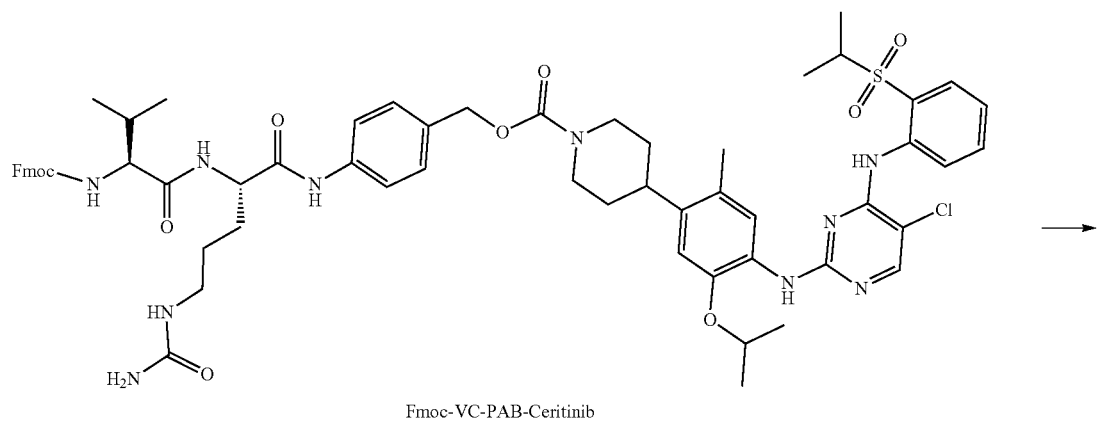
Fmoc-VC-PAB-Ceritinib
→
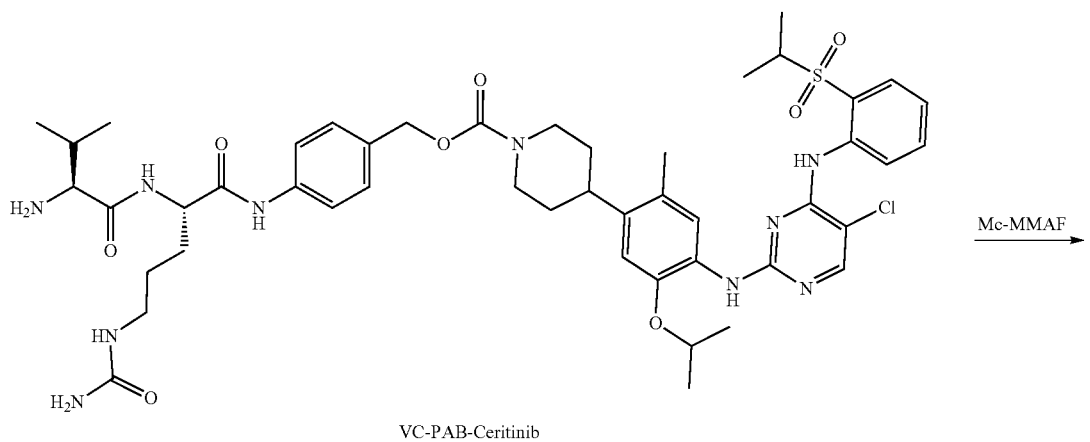
VC-PAB-Ceritinib
→ Mc-MMAF

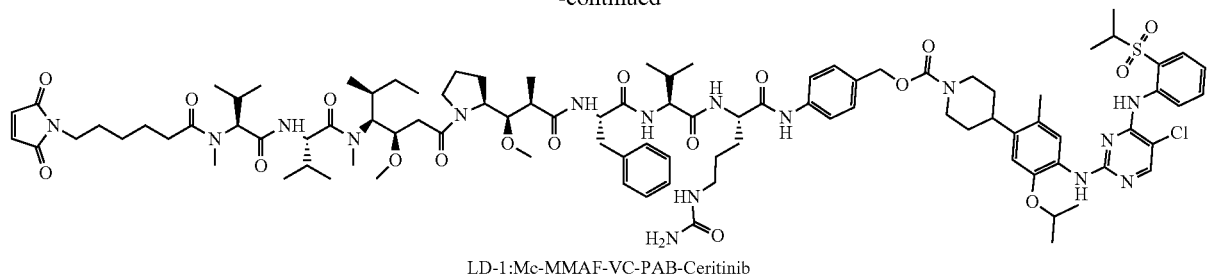

LD-1:Mc-MMAF-VC-PAB-Ceritinib 75.6 mg of Fmoc-VC-PAB-PNP and 50.0 mg of Ceritinib were added to 5 mL of N,N-dimethylformamide and 49 μL of N,N-diisopropyl ethyl amine for reaction at room temperature until the end of the reaction. The solvent was spun off. After purification by Flash method, 80.0 mg of crude Fmoc-VC-PAB-Ceritinib was obtained. LC-MS: [M+H]+: 1185.2; [M−H]−: 1183.7.

8 mL of N,N-dimethylformamide and 2 mL of N,N-diisopropyl ethyl amine were added to the crude Fmoc-VC-PAB-Ceritinib for reaction at room temperature until the end of the reaction. The solvent was spun off. After purification by liquid chromatography, 50.0 mg of pure VC-PAB-Ceritinib was obtained. LC-MS: [M+H]+: 963.4, [M−H]−: 961.6.

20.0 mg of Mc-MMAF and 9.8 mg of TSTU were add to 14.2 μL of N,N-diisopropyl ethyl amine and 18.8 mg of VC-PAB-Ceritinib for reaction at room temperature until the end of the reaction. The solvent was spun off. After purification by preparative liquid chromatography, 12.0 mg of pure Mc-MMAF—VC-PAB-Ceritinib was obtained. LC-MS: [M+H]+: =1869.8, [M−H]−: =1868.2.

(2) Preparation of Compound LD-2 (i.e., Mc-MMAF-VC-PAB-MK4827)

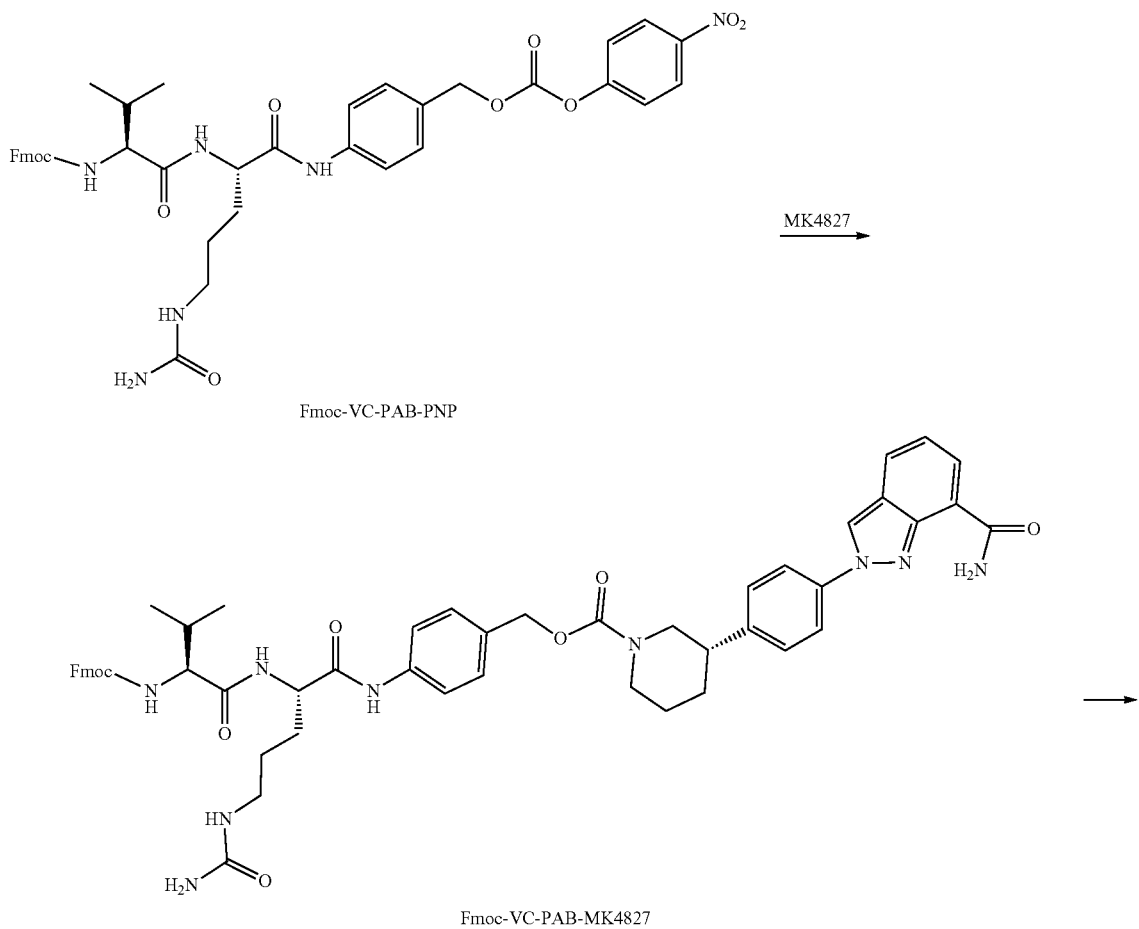

-continued

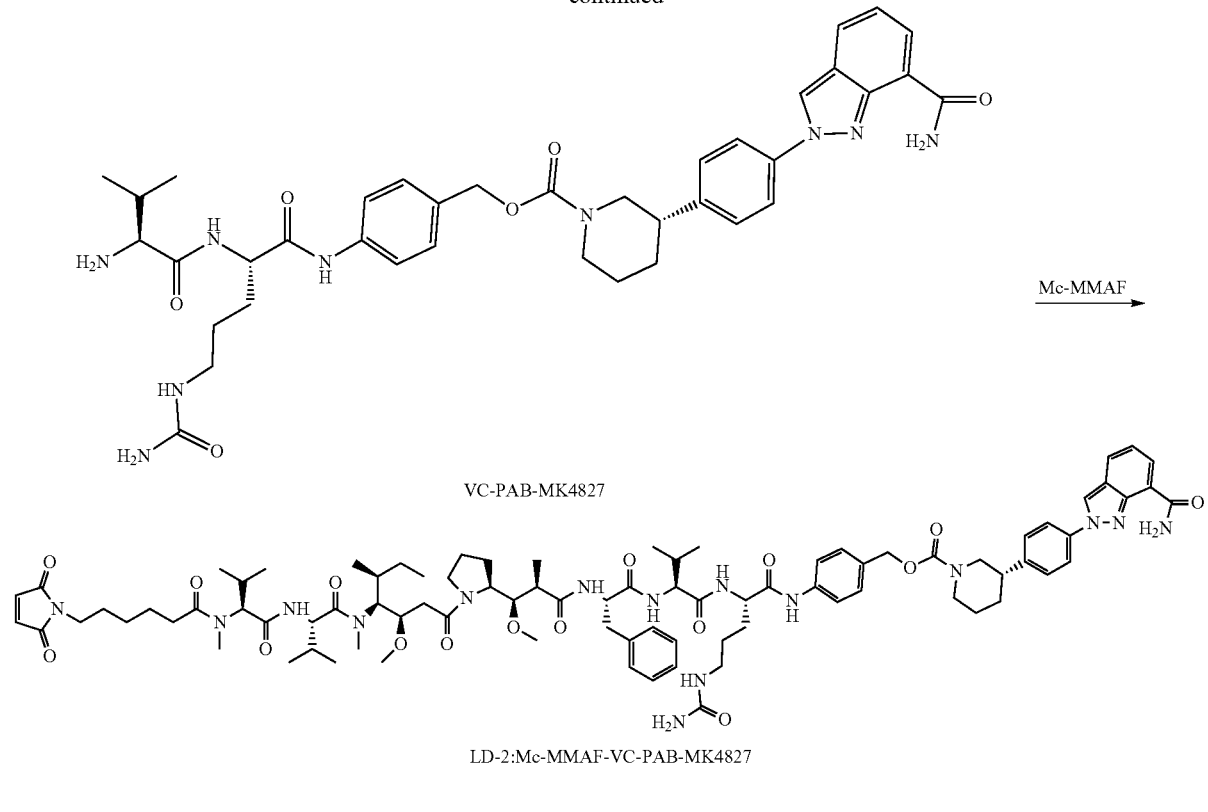

VC-PAB-MK4827

LD-2: Mc-MMAF-VC-PAB-MK4827

131.7 mg of Fmoc-VC-PAB-PNP and 50.0 mg of MK4827 (i.e., Niraparib) were added to 5 mL of N,N-dimethylformamide and 78 μL of N,N-diisopropylethylamine for reaction at room temperature until the end of the reaction. The solvent was spun off. After purification by Flash method, 98.0 mg of crude Fmoc-VC-PAB-MK4827 was obtained. LC-MS: [M+H]+: 947.5; [M−H+HCOOH]−: 992.4.

8 mL of N,N-dimethylformamide and 2 mL of N,N-diisopropylethylamine were added to the above crude Fmoc-VC-PAB-MK4827 for reaction at room temperature until the end of the reaction. The solvent was spun off. After purification by preparative liquid chromatography, 60.0 mg of pure VC-PAB-MK4827 was obtained. LC-MS: [M+H]+: 725.4, [M−H+HCOOH]−: 770.0.

20.0 mg of Mc-MMAF and 9.8 mg of TSTU were added to 14.2 μL of N,N-diisopropylethylamine and 18.8 mg of VC-PAB-MK4827 for reaction at room temperature until the end of the reaction for 16 hours. The solvent was spun off. After purification by preparative liquid chromatography, 7.0 mg of pure Mc-MMAF—VC-PAB-MK4827 was obtained. LC-MS: [M+H]+: m/z=1632.6, [M−H+HCOOH]−: m/z=1677.5.

(3) Preparation of Other Compounds

Referring to the preparation methods of compound 1 and compound 2, compound LD-3 (i.e., Mc-MMAF-VC-PAB-DMEDA-PEG(N3)-SN38), compound LD-4 (i.e., Mc-MMAF-VC-PAB-Exatecan) and compound LD-5 (i.e., Mc-MMAF-GGFG-Dxd) were prepared.

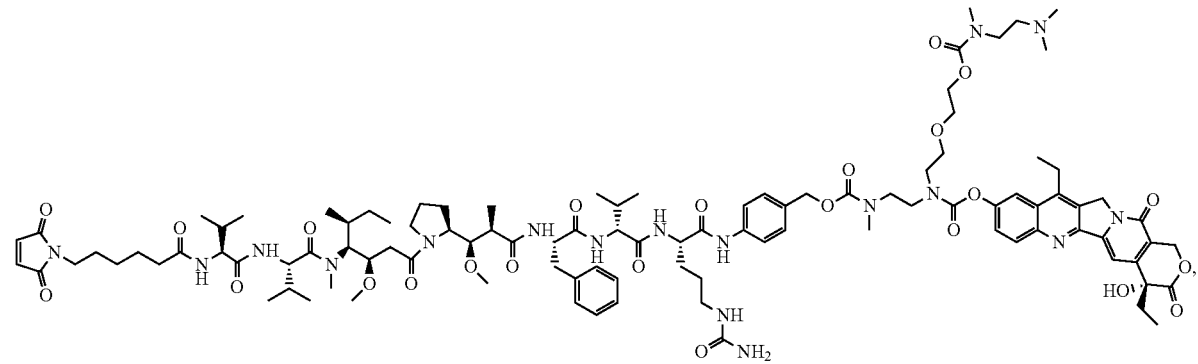

LD-3: Mc-MVAF-VC-PAB-DMEDA-PEG(N3)-SN38

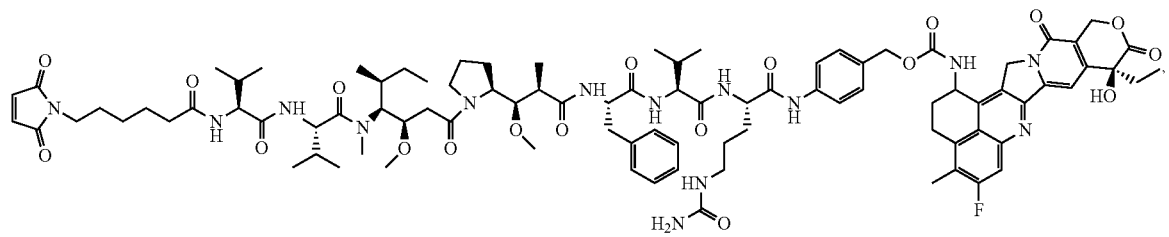

LD-4: Mc-MVAF-VC-PAB-Exatecan

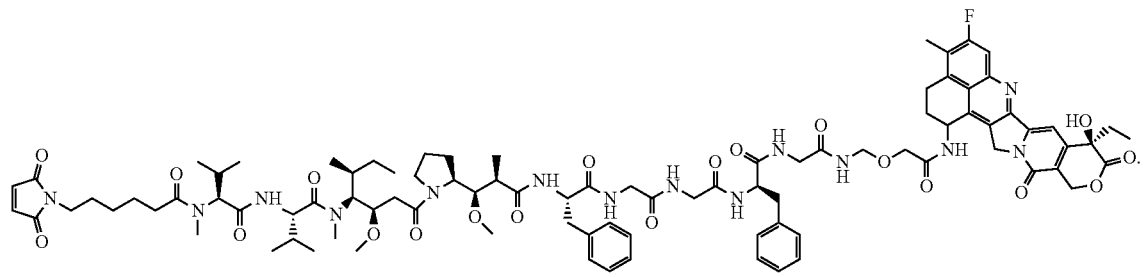

LD-5: Mc-MVAF-GGFG-Dxd

Example 2. Preparation of Antibody-Drug Conjugate

Antibody-drug conjugates (ADC) were prepared using a general coupling method: the reducing agent and protective agent were prepared as follows with purified water: 1-20 mM TCEP (Tris-2-carboxyethyl-phosphine) and 1-20 mM DTPA (Diethylene triamine pentacetate acid) mother liquors. The amount of reducing agent can be added within a certain concentration range according to the required coupling rate, and it can be mixed with a certain concentration of monoclonal antibody (such as: 5-30 mg/mL) according to a certain volume ratio (1:1), with the final concentration molar ratio of TCEP to the antibody being 0.5-6.0:1. The reaction was performed under stirring at 25° C. for 1 h. The antibody after TCEP reduction can be directly coupled.

A certain concentration (5 mM) of linker-active drug unit compound was prepared to dissolve in 25% DMSO (dimethyl sulfoxide), and the drug was slowly added according to the molar ratio of drug to sulfhydryl group of 0.3-2.8:1. The reaction was performed under stirring at 25° C. for 1-4 h. After the completion of the reaction, PBS buffer was used for centrifugation and ultrafiltration three times to remove residual unreacted drugs and free small molecules such as DMSO. The coupling was detected by SDS-PAGE electrophoresis and hydrophobic interaction chromatography high performance liquid phase (HIC-HPLC) method.

ADC1 (i.e., Ab-Mc-MMAF—VC-PAB-Ceritinib), ADC2 (i.e., Ab-Mc-MMAF—VC-PAB-MK4827), ADC3 (i.e., Ab-Mc-MMAF—VC-PAB-DMEDA-PEG(N3)-SN38), ADC4 (i.e., Ab-Mc-MMAF—VC-PAB-Exatecan), and ADC5 (i.e., Ab-Mc-MMAF-GGFG-Dxd) were prepared by the method provided in this example, wherein p is any integer selected from 1, 2, 3, 4, 5, 6, 7, and 8, and the Ab used is a HER2 antibody.

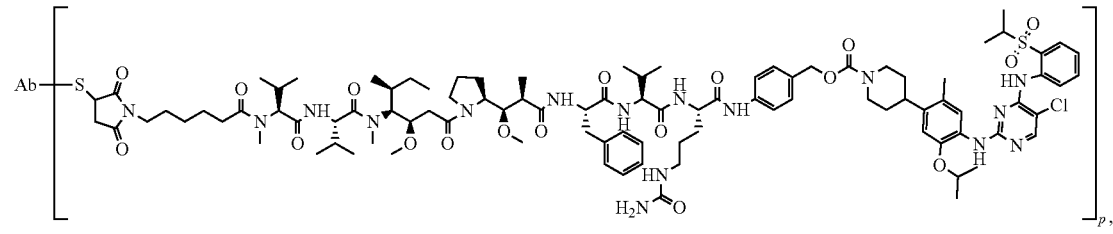

ADC1: Ab-Mc-MMAF-VC-PAB-Ceritinib

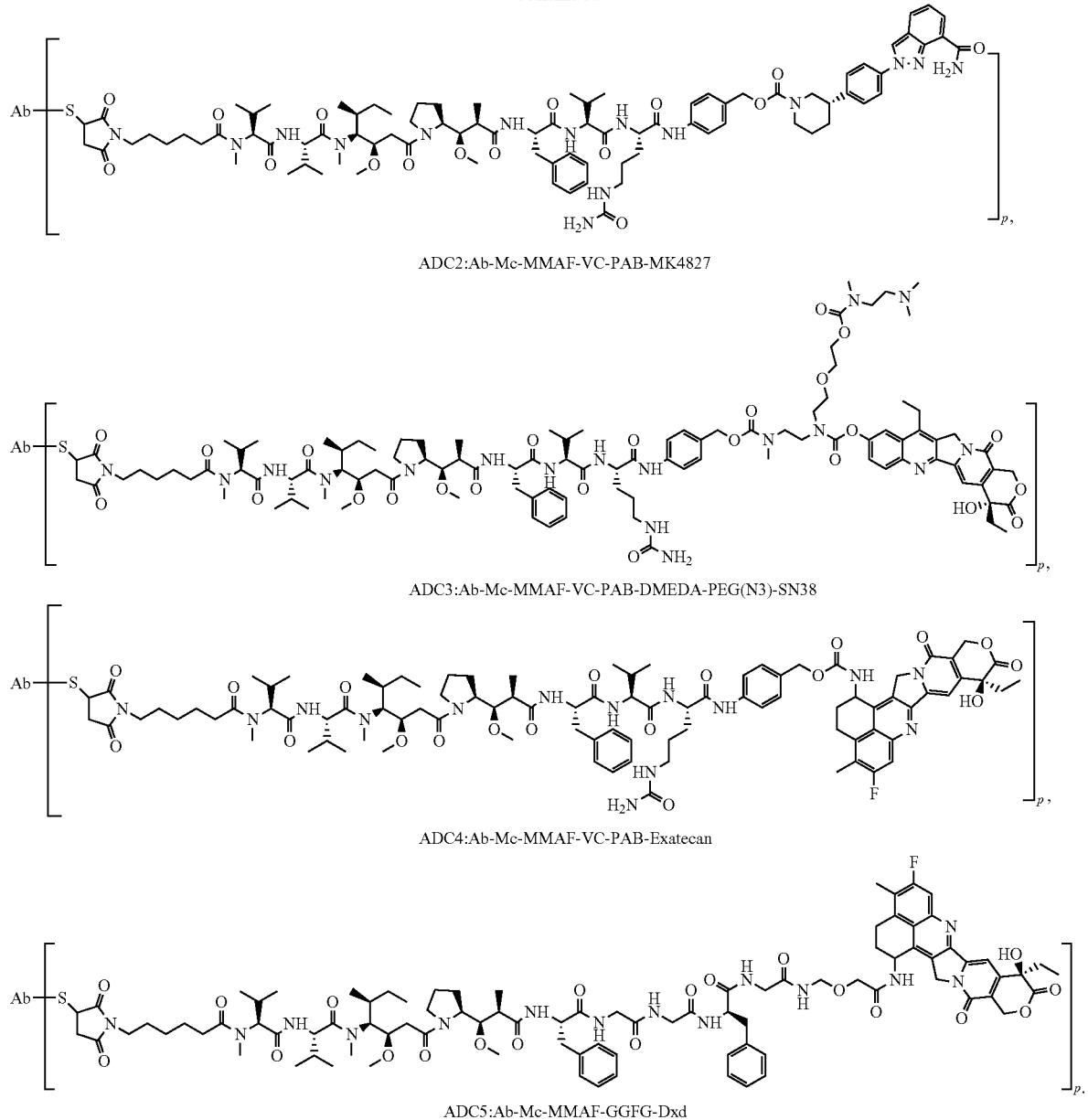

ADC2:Ab-Mc-MMAF-VC-PAB-MK4827

ADC3:Ab-Mc-MMAF-VC-PAB-DMEDA-PEG(N3)-SN38

ADC4:Ab-Mc-MMAF-VC-PAB-Exatecan

ADC5:Ab-Mc-MMAF-GGFG-Dxd

Example 3. Evaluation of Cell Viability In Vitro (1) Evaluation of Breast Cancer Cell SK-BR-3 Activity In this example, the cell proliferation inhibition method was used to evaluate the effect of Her2 mAb-Mc-MMAF—VC-PAB-MK4827 and Her2 mAb-Mc-MMAF—VC-PAB-DMEDA-PEG(N3)-SN38 on the cell viability of breast cancer cell SK-BR-3.

After digesting SK-BR-3 cells with trypsin, the cells were adjusted to the cell density of 50,000 cells/ml, and added to cell culture plates at 100 μL/well, and then incubated in a 37° C., 5% $CO_2$ incubator for 14-20 h. The test samples (see Table 2 for sample group and control group) were serially diluted with basal medium, and transferred to cell culture plates seeded with cells at 100 l/well, and then incubated in a 37° C., 5% $CO_2$ incubator for 70-74 h. CCK-8 was diluted 10 times with culture medium, and the old culture medium in 96-well plates was removed by a pipette, then 100 μL of diluted CCK-8 solution was added to each well followed by color development under 500 $CO_2$ condition for 2-4 h. After centrifugation to remove bubbles, the measurement wavelength 450 nm/655 nm was selected on the microplate reader for reading.

TABLE 2

| | Test samples |
|---|---|
| No. | Test sample |
| Sample 1 | HER2 mAb-Mc-MMAF-VC-PAB-MK4827 |
| Control 1-1 | HER2 mAb-Mc-MMAF |
| Control 1-2 | HER2 mAb-Mc-VC-PAB-MK4827 |
| Control 1-3 | HER2 mAb-Mc-MMAF and HER2 mAb-Mc-VC-PAB-MK4827, mixed at a mass concentration of 1:1 |

TABLE 2-continued

| | Test samples |
|---|---|
| No. | Test sample |
| Control 1-4 | HER2 antibody |
| Sample 2 | HER2 mAb-Mc-MMAF-VC-PAB-DMEDA-PEG(N3)-SN38 |
| Control 2-1 | HER2 mAb-Mc-MMAF |
| Control 2-2 | HER2 mAb-Mc-VC-PAB-DMEDA-PEG(N3)-SN38 |
| Control 2-3 | HER2 mAb-Mc-MMAF and HER2 mAb-Mc-VC-PAB-DMEDA-PEG(N3)-SN38, mixed at a mass concentration of 1:1 |
| Control 2-4 | HER2 antibody |

The results in Table 3 show that the inhibitory effect of HTER2 mAb-Mc-MMAF-VC-PAB-M1K4827 on SK-BR-3 cells is better than that of HER2 mAb-Mc-MMAF, HTER2 mAb-Mc-VC-PAB-MK4827, a mixture of HER2 mAb-Mc-MMAF and HER2 mAb-Mc-VC-PAB-M1K4827, HER2 antibody; the inhibitory effect of HTER2 mAb-Mc-MMAF—VC-PAB-DMEDA-PEG(N3)-SN38 on SK-BR-3 cells is better than HER2 mAb-Mc-MMAF, HER2 mAb-Mc-VC-PAB-DMEDA-PEG(N3)-SN38, a mixture of HER2 mAb-Mc-MMAF and HTER2 mAb-Mc-VC-PAB-DMEDA-PEG(N3)-SN38, HER2 antibody. And the two toxins in the dual-toxin-series group produced a synergistic effect.

TABLE 3

Inhibitory effect on SK-BR-3 cells

| No. | Test sample | IC50 (ng/ml) |
|---|---|---|
| Sample 1 | HER2 mAb-Mc-MMAF-VC-PAB-MK4827 | 0.60 |
| Control 1-1 | HER2 mAb-Mc-MMAF | 0.89 |
| Control 1-2 | HER2 mAb-Mc-VC-PAB-MK4827 | NA |
| Control 1-3 | HER2 mAb-Mc-MMAF and HER2-Mc-VC-PAB-MK4827, mixed at a mass concentration of 1:1 | 1.59 |
| Control 1-4 | HER2 antibody | NA |
| Sample 2 | HER2 mAb-Mc-MMAF-VC-PAB-DMEDA-PEG(N3)-SN38 | 0.46 |
| Control 2-1 | HER2 mAb-Mc-MMAF | 0.89 |
| Control 2-2 | HER2 mAb-Mc-VC-PAB-DMEDA-PEG(N3)-SN38 | NA |
| Control 2-3 | HER2 mAb-Mc-MMAF and HER2 mAb-Mc-VC-PAB-DMEDA-PEG(N3)-SN38, mixed at a mass concentration of 1:1 | 1.94 |
| Control 2-4 | HER2 antibody | NA |

(2) Evaluation of Activity on Gastric Cancer Cells SK-BR-3

In this example, the cell proliferation inhibition method was used to evaluate the effect of Her2 mAb-Mc-MMAF-VC-PAB-DMVEDA-PEG(N3)-SN38 on the cell viability of gastric cancer cells NCI-N87.

After digesting NCI-N87 cells with trypsin, the cells were adjusted to the cell density of 50,000 cells/ml, and added to cell culture plates at 100 μL/well, and then incubated in a 37° C., 5% $CO_2$ incubator for 14-20 h. The test samples (see Table 4 for sample group and control group) were serially diluted with basal medium, and transferred to cell culture plates seeded with cells at 100 μl/well, and then incubated in a 37° C., 5% $CO_2$ incubator for 70-74 h. CCK-8 was diluted 10 times with culture medium, and the old culture medium in 96-well plates was removed by a pipette, then 100 μL of diluted CCK-8 solution was added to each well followed by color development under 500 $CO_2$ condition for 2-4 h. After centrifugation to remove bubbles, the measurement wavelength 450 nm/655 nm was selected on the microplate reader for reading.

TABLE 4

| | Test samples |
|---|---|
| No. | Test sample |
| Sample 3 | HER2 mAb-Mc-MMAF-VC-PAB-DMEDA-PEG(N3)-SN38 |
| Control 3-1 | HER2 mAb-Mc-MMAF |
| Control 3-2 | HER2 mAb-Mc-VC-PAB-DMEDA-PEG(N3)-SN38 |
| Control 3-3 | HER2 mAb-Mc-MMAF and HER2 mAb-Mc-VC-PAB-DMEDA-PEG(N3)-SN38, mixed at a mass concentration of 1:1 |
| Control 3-4 | HER2 antibody |

The results in Table 5 show that the inhibitory effect of HER2 mAb-Mc-MMAF-VC-PAB-DMEDA-PEG(N3)-SN38 on NC3-N87 cells is better than that of a mixture of HER2 mAb-Mc-MMAF and HER2 mAb-Mc-VC-PAB-DMEDA-PEG(N3)-SN38, and HER2 antibody. And the two toxins in the dual-toxin-series group produced a prominent synergistic effect.

TABLE 5

Inhibitory effect on NCI-N87 cells

| No. | Test sample | IC50 (ng/ml) |
|---|---|---|
| Sample 3 | HER2 mAb-Mc-MMAF-VC-PAB-DMEDA-PEG(N3)-SN38 | 3.0 |
| Control 3-1 | HER2 mAb-Mc-MMAF | 6.5 |
| Control 3-2 | HER2 mAb-Mc-VC-PAB-DMEDA-PEG(N3)-SN38 | 251.2 |
| Control 3-3 | HER2 mAb-Mc-MMAF and HER2 mAb-Mc-VC-PAB-DMEDA-PEG(N3)-SN38, mixed at a mass concentration of 1:1 | 16.7 |
| Control 3-4 | HER2 antibody | NA |

The present disclosure has been exemplified by various specific examples. However, those skilled in the art can understand that the present disclosure is not limited to various specific embodiments. Those skilled in the art can make various modifications or changes to the present disclosure, and various technical features mentioned throughout the text can be combined with each other without departing from the spirit and scope of the present disclosure. Such changes and modifications are within the scope of the present disclosure.

The invention claimed is:

1. An antibody-drug conjugate having the following structural formula,

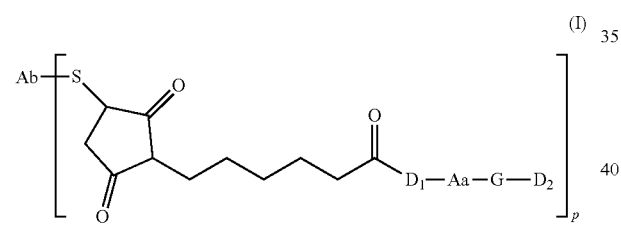

wherein,

Ab is an antibody or antigen-binding fragment;

S is the sulfur atom in the sulfhydryl residue formed after an interchain disulfide bond on the Ab is opened;

Aa is an amino acid unit comprising one or more amino acids;

G is an optional cracking unit, selected from the group consisting of

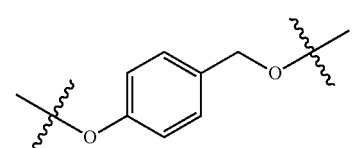

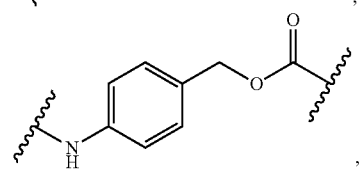

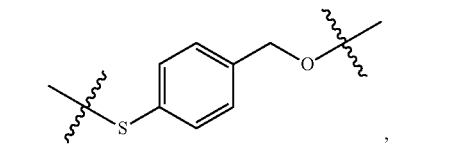

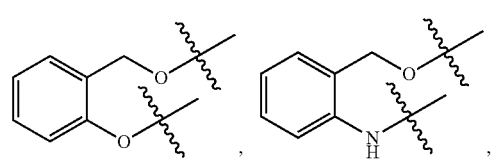

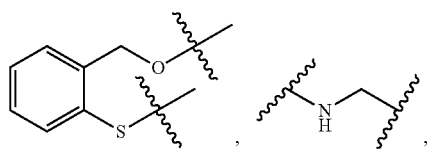

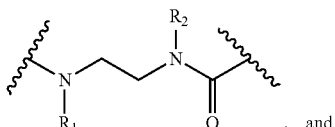

, and

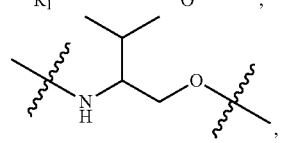

, wherein the $R_1$ and $R_2$ are independently selected from the group consisting of H, $C_1$-$C_{10}$ alkyl and

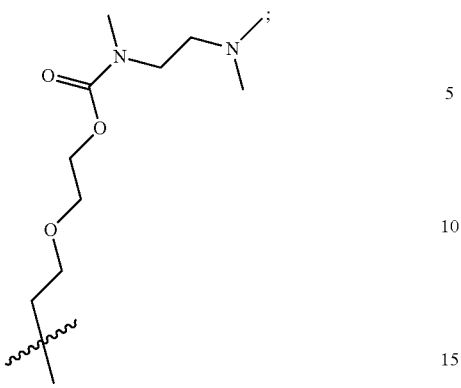

D₁ is selected from the following structure or a tautomer, mesomer, racemate, enantiomer, diastereomer thereof or a mixture thereof, or a pharmaceutically acceptable salt or solvate thereof:

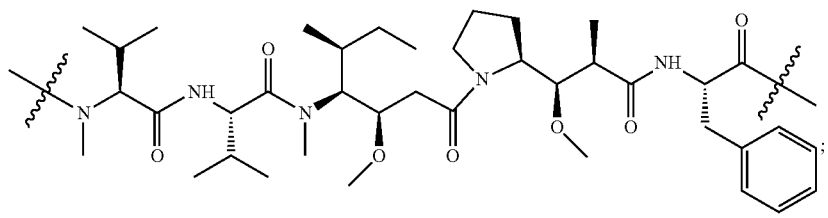 [SMILES: *C(=O)[C@H](Cc1ccccc1)NC(=O)[C@H](C)[C@@H](OC)[C@@H]1CCCN1C(=O)C[C@@H](OC)[C@H]([C@@H](C)CC)N(C)C(=O)[C@@H](NC(=O)[C@H](C(C)C)N(*)C)C(C)C]

D₂ is a second active drug unit other than MMAF, which is selected from the group consisting of ALK inhibitor, PARP inhibitor, Dxd, SN38, and Exatecan, or a tautomer, mesomer, racemate, enantiomer, diastereomer thereof or a mixture thereof, or a pharmaceutically acceptable salt or solvate thereof;

p is an integer selected from 1, 2, 3, 4, 5, 6, 7, and 8;

or a pharmaceutically acceptable salt thereof.

2. The antibody-drug conjugate or a pharmaceutically acceptable salt thereof according to claim 1, wherein the Ab is an intact antibody selected from the group consisting of a murine antibody, a chimeric antibody, a humanized antibody, and a full human antibody; or an antigen-binding fragment thereof.

3. The antibody-drug conjugate or a pharmaceutically acceptable salt thereof according to claim 2, wherein the antigen-binding fragment is selected from the group consisting of Fab, Fab', F(ab)₂, and F(ab')₂; and the antibody is selected from the group consisting of a bispecific antibody and a multispecific antibody.

4. The antibody-drug conjugate or a pharmaceutically acceptable salt thereof according to claim 3, wherein the Ab has the Fc domain of a human IgG1 antibody, or the hinge domain of a human IgG1 antibody, or the Fc domain of a human IgG4 antibody, or the hinge domain of a human IgG4 antibody.

5. The antibody-drug conjugate or a pharmaceutically acceptable salt thereof according to claim 1, wherein the amino acid unit Aa is selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine (trityl)-, -lysine (monomethoxytrityl)-, -lysine (fluorenylmethoxycarbonyl)-; -valine-citrulline- (-Val-Cit-), -valine-alanine-(-Val-Ala-), -valine-lysine-(-Val-Lys-), -valine-lysine (trityl)-(-Val-Lys (Trt)-), -valine-lysine (monomethoxytrityl)-(-Val-Lys (Mmt)-), -valine-lysine (fluorenylmethoxycarbonyl)-(-Val-Lys (Fmoc)-), -valine-arginine-(-Val-Arg-), -phenylalanine-citrulline-(-Phe-Cit-), -phenylalanine-lysine-(-Phe-Lys-), -phenylalanine-lysine (trityl)-(-Phe-Lys (Trt)-), -phenylalanine-lysine (monomethoxytrityl)-(-Phe-Lys (Mmt)-), -phenylalanine-lysine (fluorenylmethoxycarbonyl)-(-Phe-Lys (Fmoc)-), -leucine-citrulline-(-Leu-Cit-), -isoleucine-citrulline-(-Ile-Cit-), -phenylalanine-arginine-(-Phe-Arg-); -phenylalanine-arginine-arginine-(-Ala-Arg-Arg-); -glycine-glycine-phenylalanine-glycine- (SEQ ID NO:1, -Gly-Gly-Phe-Gly-), -glycine-phenylalanine-leucine-glycine- (SEQ ID NO:2, -Gly-Phe-Leu-Gly-), and -alanine-leucine-alanine-leucine (SEQ ID NO: 3, -Ala-Leu-Ala-Leu-).

6. A method of treating a cancer, infectious disease or autoimmune disease, comprising administering the antibody-drug conjugate or a pharmaceutically acceptable salt thereof according to claim 1 to a subject in need thereof.

7. The antibody-drug conjugate or a pharmaceutically acceptable salt thereof according to claim 1, wherein D₂ is selected from the group consisting of MK4827 and Ceritinib.

8. A antibody-drug conjugate or a pharmaceutically acceptable salt thereof, wherein the antibody-drug conjugate is selected from the following structures, wherein p is an integer selected from 1, 2, 3, 4, 5, 6, 7, and 8:

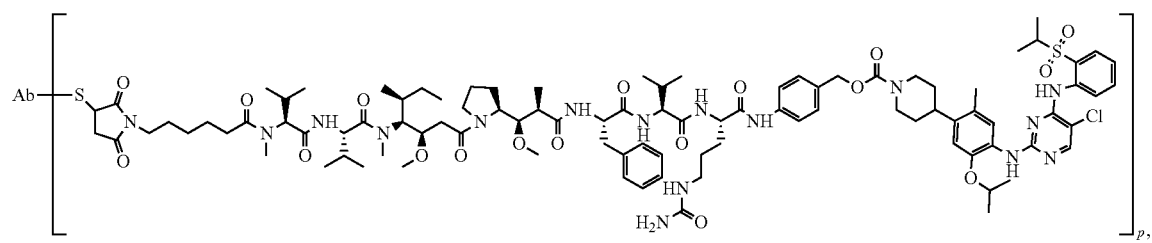
ADC1:Ab-Mc-MMAF-VC-PAB-Ceritinib
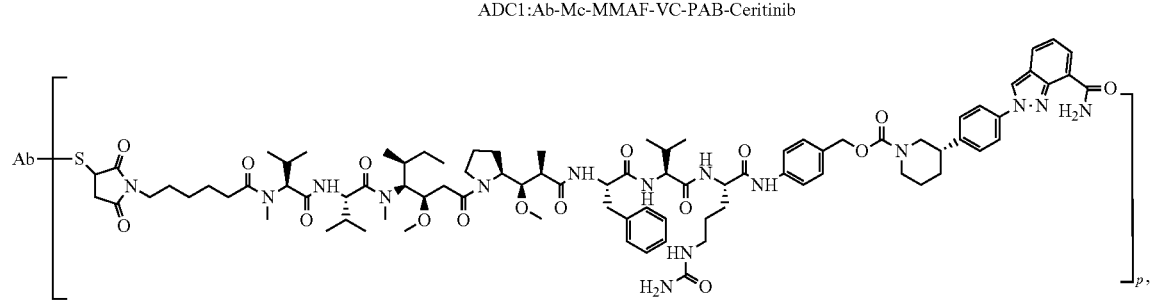
ADC2:Ab-Mc-MMAF-VC-PAB-MK4827
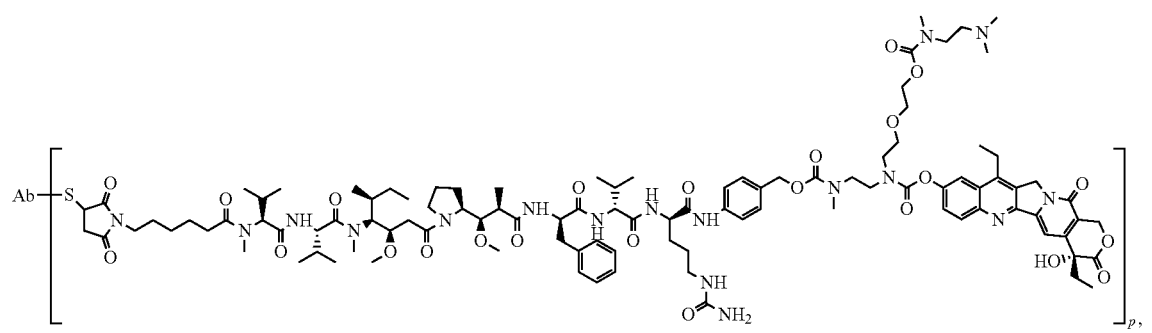
ADC3:Ab-Mc-MMAF-VC-PAB-DMEDA-PEG(N3)-SN38
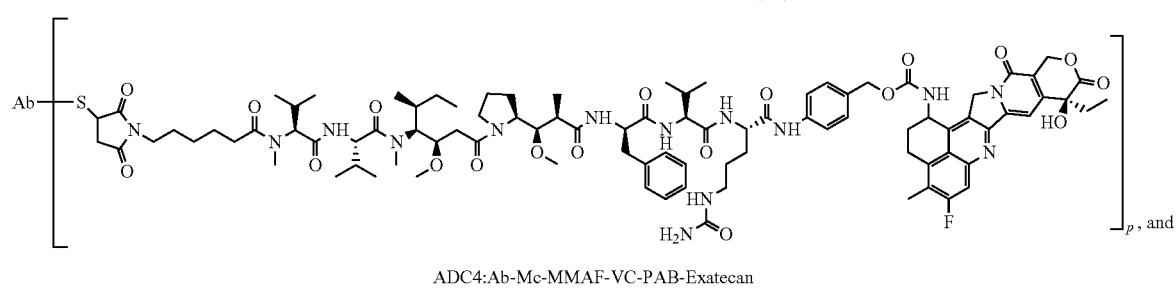
ADC4:Ab-Mc-MMAF-VC-PAB-Exatecan
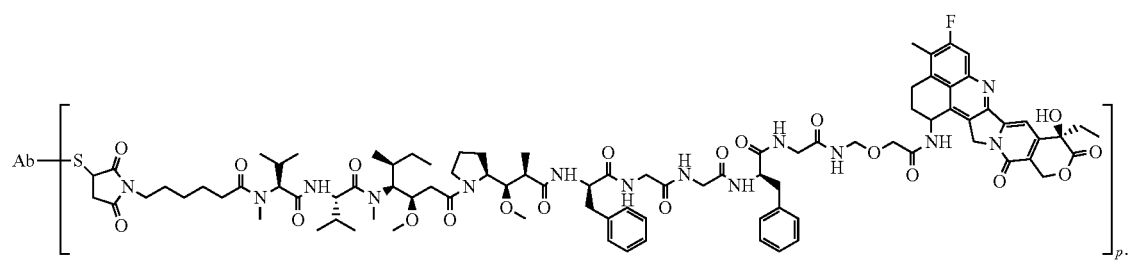
ADC5:Ab-Mc-MMAF-GGFG-DXd (SEQ ID NO: 1, GGFG)

9. An intermediate compound having a structure shown in the following formula:

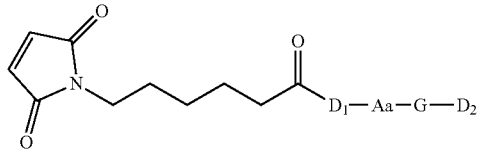
(II)

wherein:

Aa is an amino acid unit comprising one or more amino acids;

G is an optional cracking unit, selected from the group consisting of

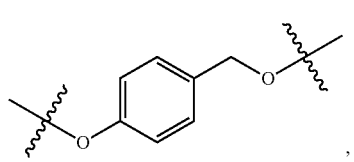,

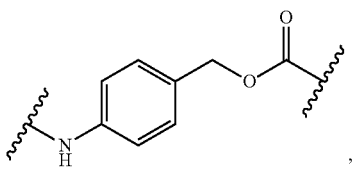,

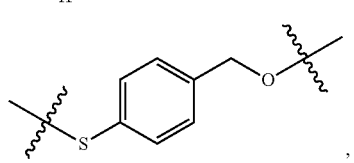,

-continued

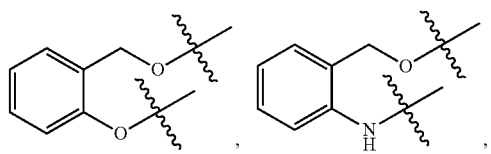,

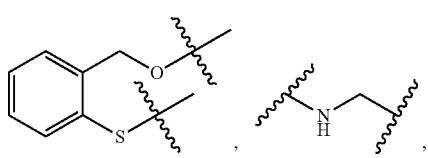,

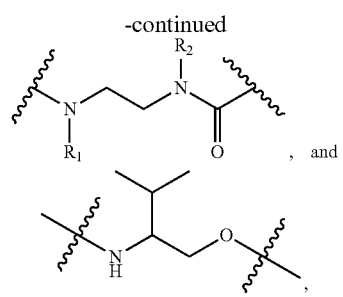, and wherein the $R_1$ and $R_2$ are independently selected from the group consisting of H, $C_1$-$C_{10}$ alkyl and

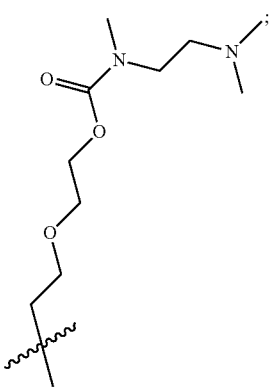 [SMILES: *CCOCCOC(=O)N(C)CCN(C)C]

$D_1$ is selected from the following structure or a tautomer, mesomer, racemate, enantiomer, diastereomer thereof or a mixture thereof, or a pharmaceutically acceptable salt or solvate thereof:

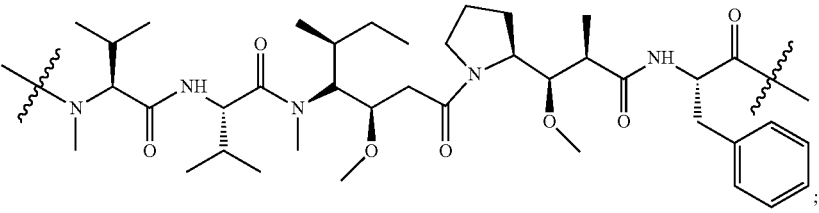;

$D_2$ is a second active drug unit other than MMAF, which is selected from the group consisting of ALK inhibitor, PARP inhibitor, Dxd, SN38, and Exatecan, or a tautomer, mesomer, racemate, enantiomer, diastereomer thereof or a mixture thereof, or a pharmaceutically acceptable salt or solvate thereof.

10. The compound according to claim 9, wherein the amino acid unit Aa is selected from the group consisting of -glycine-, -alanine-, -valine-, -leucine-, -isoleucine-, -proline-, -phenylalanine-, -tryptophan-, -methionine-, -tyrosine-, -serine-, -threonine-, -cysteine-, -asparagine-, -glutamine-, -aspartic acid-, -glutamic acid-, -lysine-, -arginine-, -histidine-, -citrulline-, -lysine (trityl)-, -lysine (monomethoxytrityl)-, -lysine (fluorenylmethoxycarbonyl)-; -valine-citrulline-(-Val-Cit-), -valine-alanine-(-Val-Ala-), -valine-lysine-(-Val-Lys-), -valine-lysine (trityl)-(-Val-Lys (Trt)-), -valine-lysine (monomethoxytrityl)-(-Val-Lys (Mmt)-), -valine-lysine (fluorenylmethoxycarbonyl)-(-Val-Lys (Fmoc)-), -valine-arginine-(-Val-Arg-), -phenylalanine-citrulline-(-Phe-Cit-), -phenylalanine-lysine-(-Phe-Lys-), -phenylalanine-lysine (trityl)-(-Phe-Lys (Trt)-), -phenylalanine-lysine (monomethoxytrityl)-(-Phe-Lys (Mmt)-), -phenylalanine-lysine (fluorenylmethoxycarbonyl)-(-Phe-Lys (Fmoc)-), -leucine-citrulline-(-Leu-Cit-), -isoleucine-citrulline-(-Ile-Cit-), -phenylalanine-arginine-(-Phe-Arg-); -phenylalanine-arginine-arginine-(-Ala-Arg-Arg-); -glycine-glycine- phenylalanine-glycine- (SEQ ID NO:1, -Gly-Gly-Phe-Gly-), -glycine-phenylalanine-leucine-glycine- (SEQ ID NO:2, -Gly-Phe-Leu-Gly-), and -alanine-leucine-alanine-leucine (SEQ ID NO:3, -Ala-Leu-Ala-Leu-).

11. The intermediate compound of claim 9, wherein the compound is selected from the following structures:

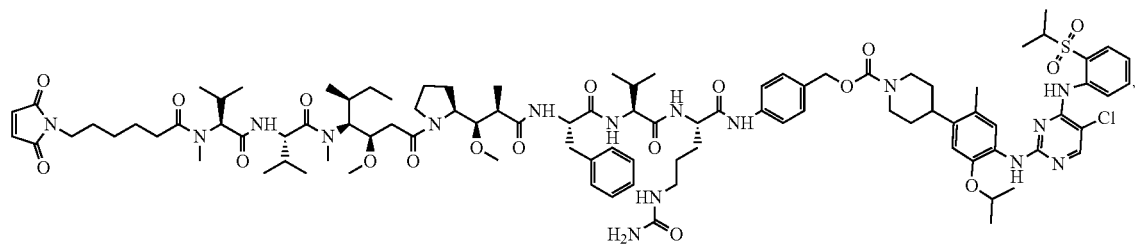

LD-1:Mc-MMAF-VC-PAB-Ceritinib

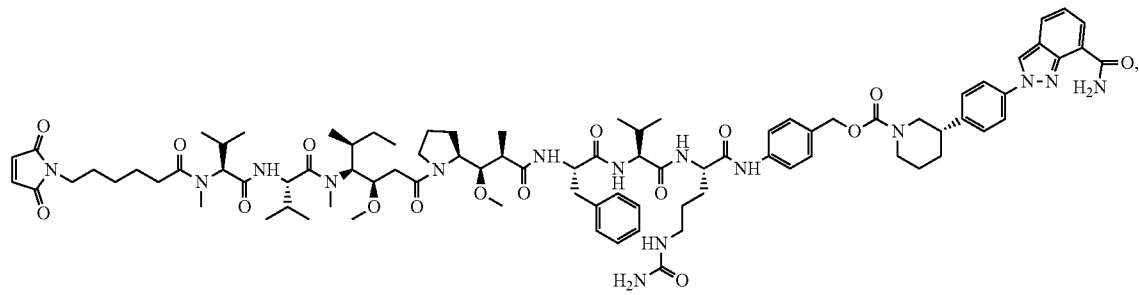

LD-2:Mc-MMAF-VC-PAB-MK4827

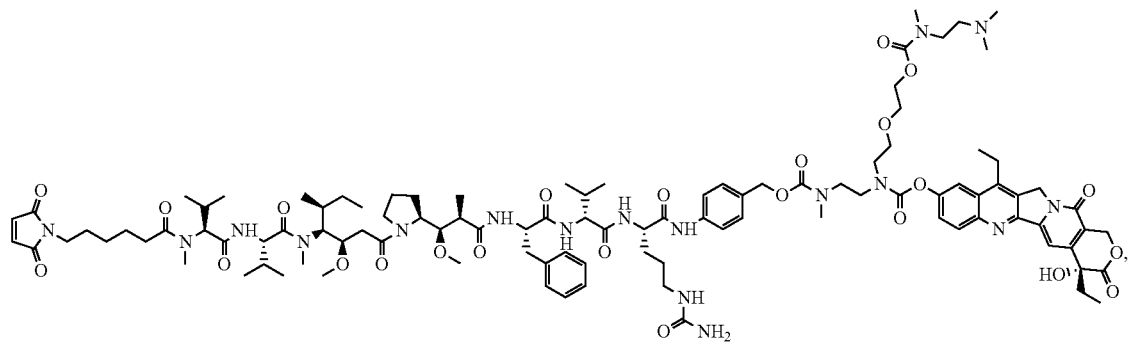

LD-3:Mc-MMAF-VC-PAB-DMEDA-PEG(N3)-SN38

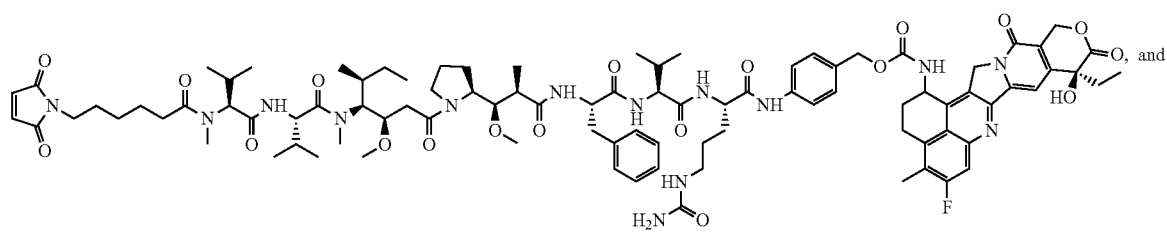

LD-4:Mc-MMAF-VC-PAB-Exatecan

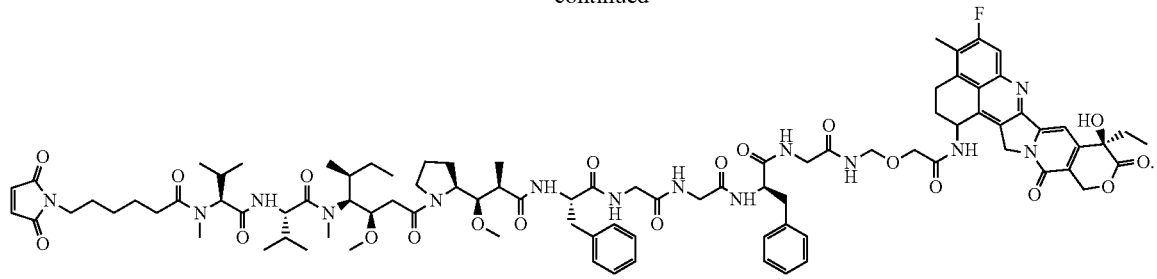

LD-5:Mc-MMAF-GGFG-Dxd (SEQ ID NO: 1, GGFG)

12. A method of synthesizing the intermediate compound of claim 9, wherein the synthetic route of the synthetic method is:

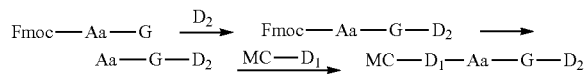

the synthetic method comprises the following steps:

Step 1: dissolving the compound Fmoc-Aa-G, the second active drug unit $D_2$, and organic base 1 in organic solvent 1, and allowing them to contact and react to obtain compound Fmoc-Aa-G-$D_2$;

Step 2: removing the protection group Fmoc from the compound Fmoc-Aa-G-$D_2$ to obtain the compound Aa-G-$D_2$;

Step 3: dissolving the compound Aa-G-$D_2$, the compound Mc-$D_1$, and condensing agent 1 in organic solvent 2, and allowing them to contact and react to obtain the compound Mc-$D_1$-Aa-G-$D_2$;

wherein the organic base 1 is selected from one or more of N,N-diisopropylethylamine, triethylamine, and pyridine; the organic solvent 1 and the organic solvent 2 are each independently selected from one or both of DMF and DMA; the condensing agent 1 is selected from one or more of TSTU, HATU, HBTU, HCTU, PyBop, CDMT, and T3P.

13. The synthetic method according to claim 12, wherein the synthetic route is selected from the following:

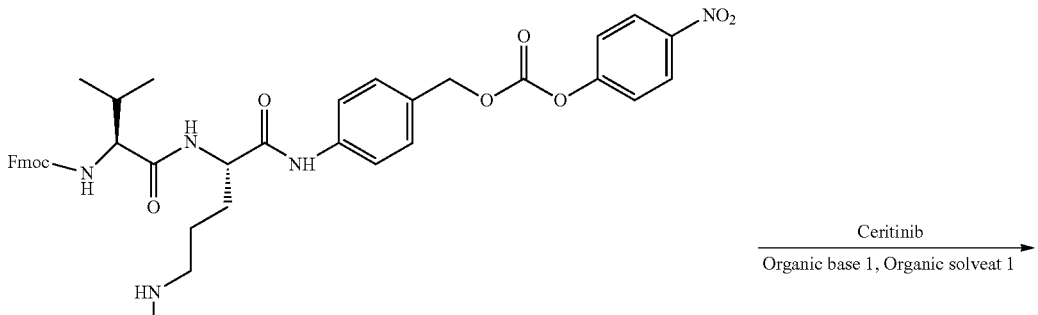

Fmoc-VC-PAB-PNP

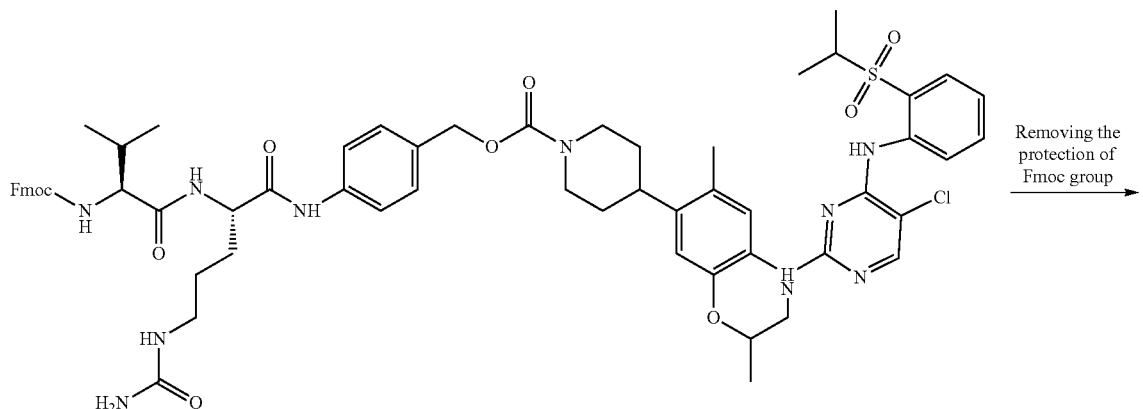

Fmoc-VC-PAB-Ceritinib

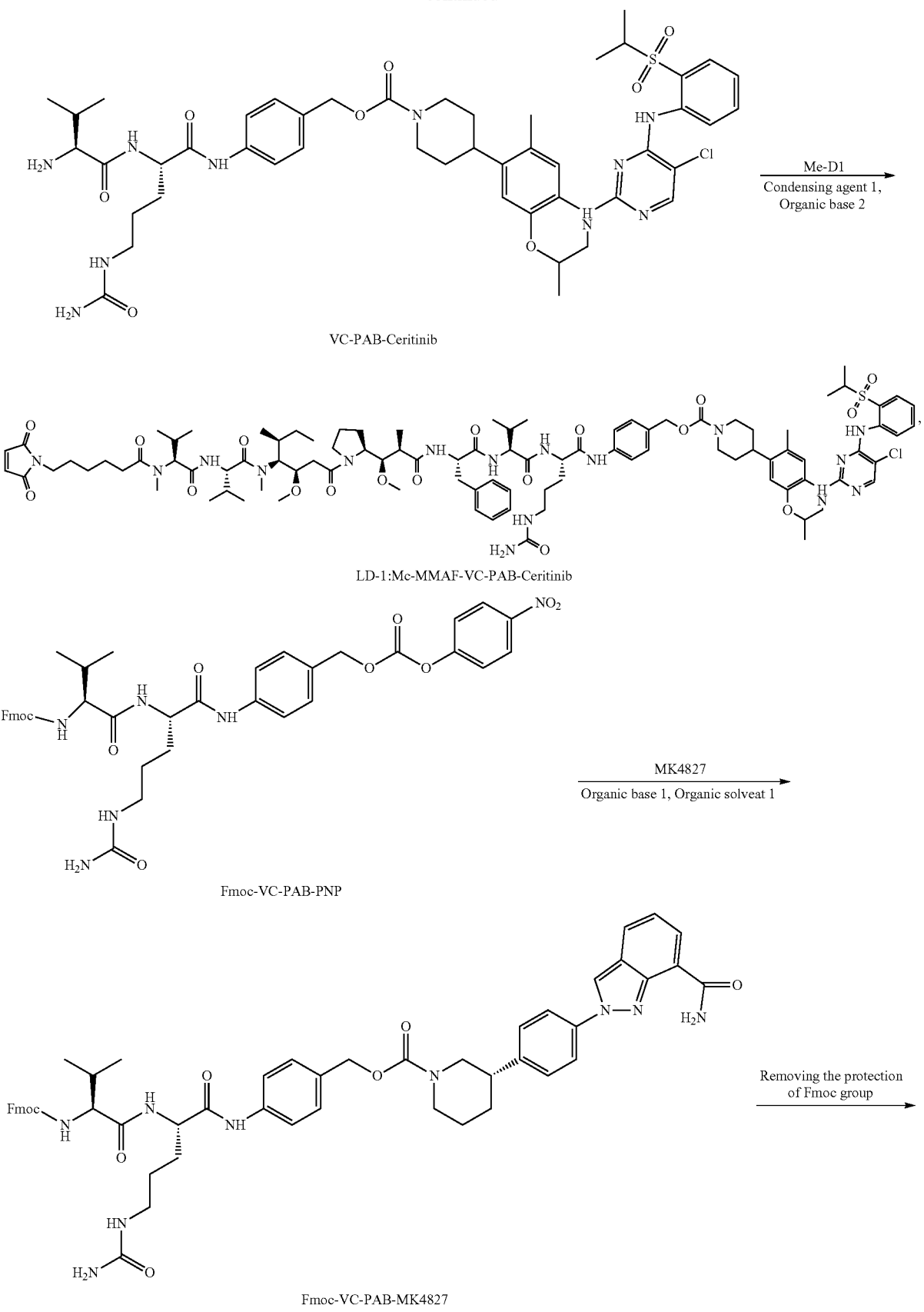

-continued
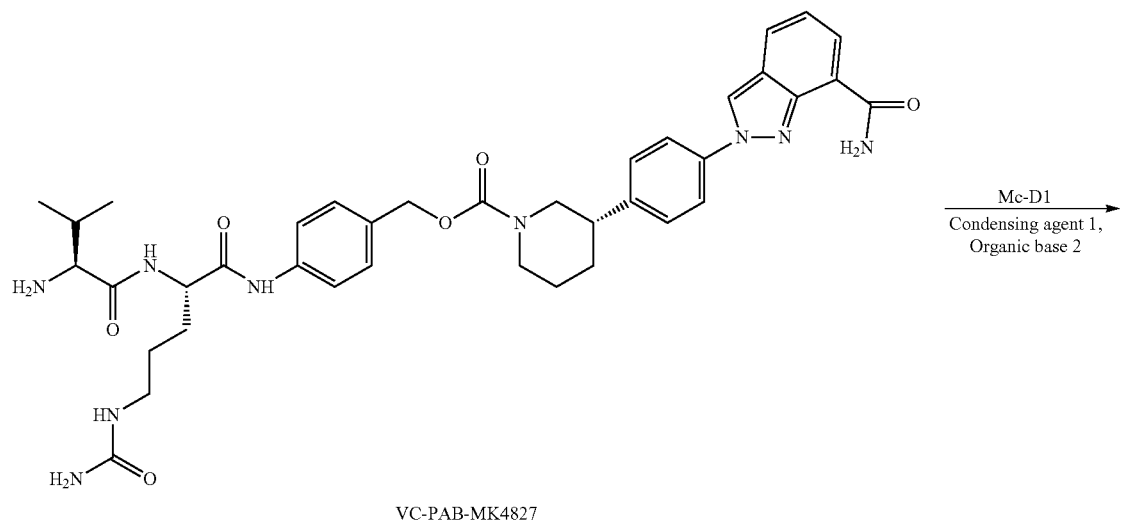
VC-PAB-MK4827
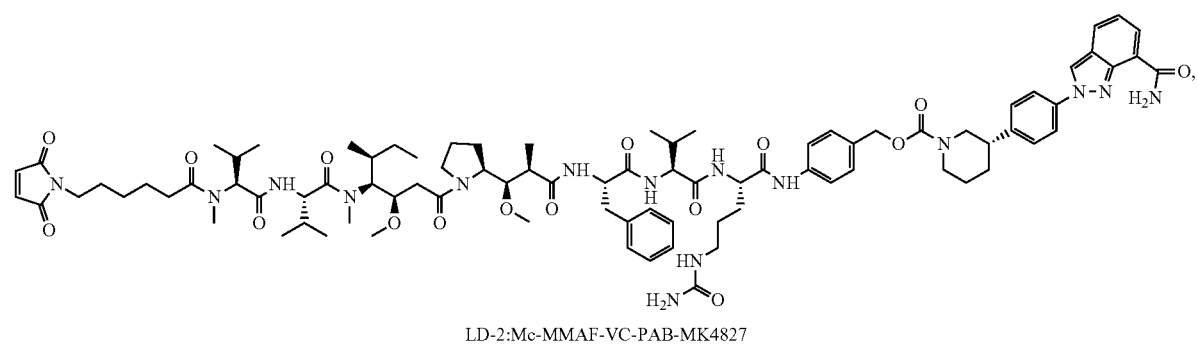
LD-2:Mc-MMAF-VC-PAB-MK4827
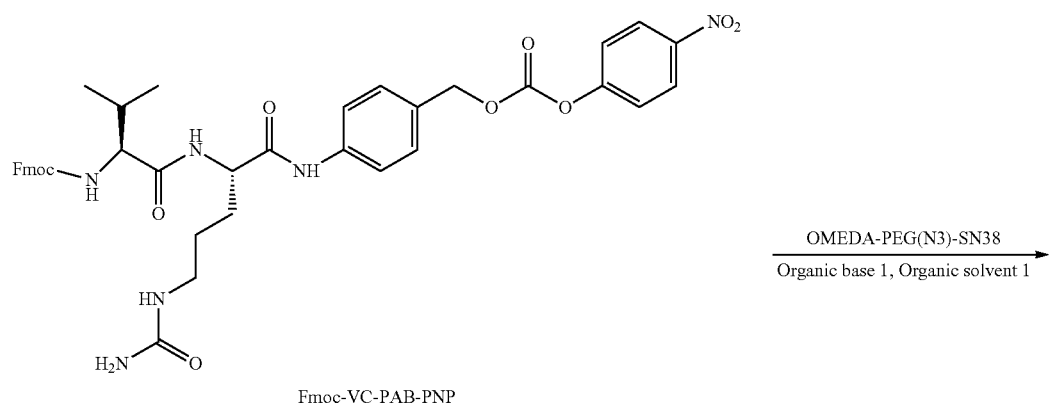
Fmoc-VC-PAB-PNP -continued
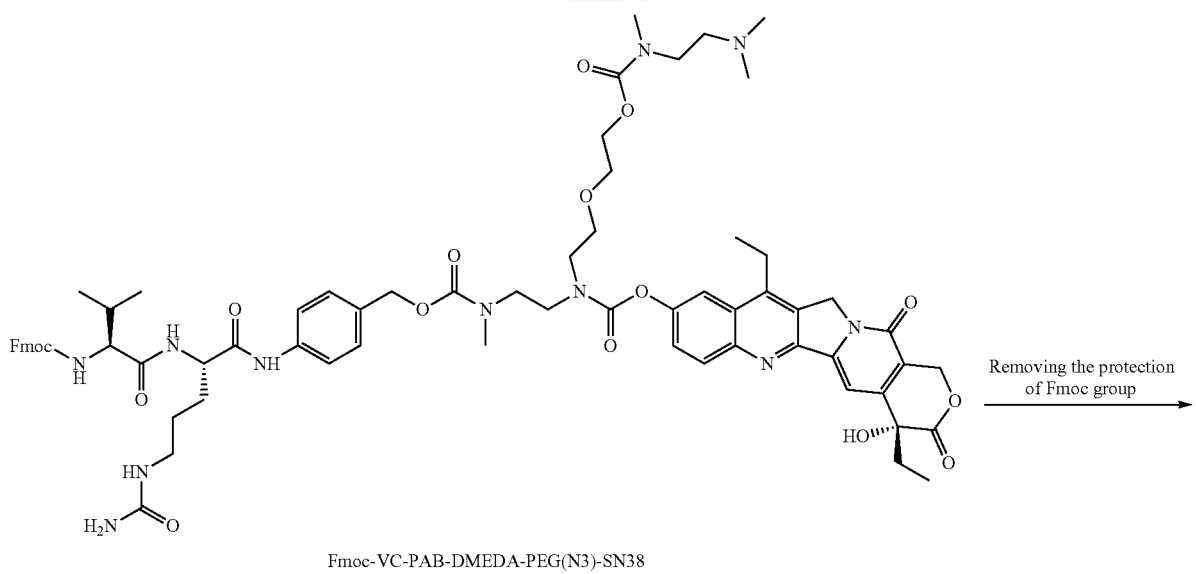
Fmoc-VC-PAB-DMEDA-PEG(N3)-SN38
Removing the protection of Fmoc group →
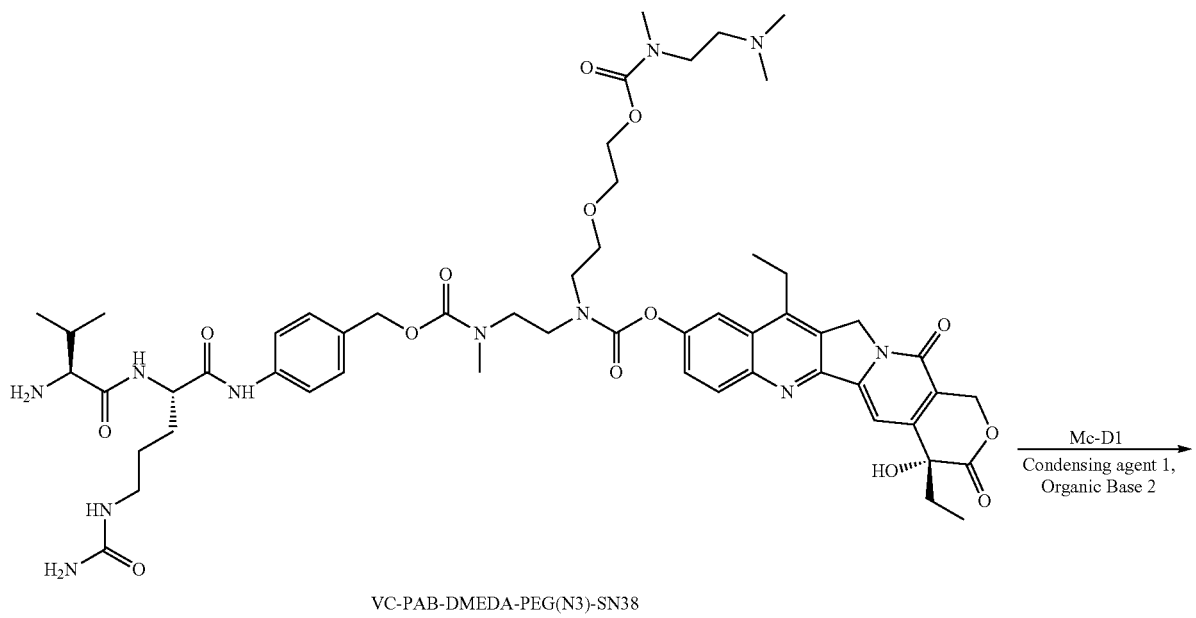
VC-PAB-DMEDA-PEG(N3)-SN38
Mc-D1
Condensing agent 1,
Organic Base 2
→
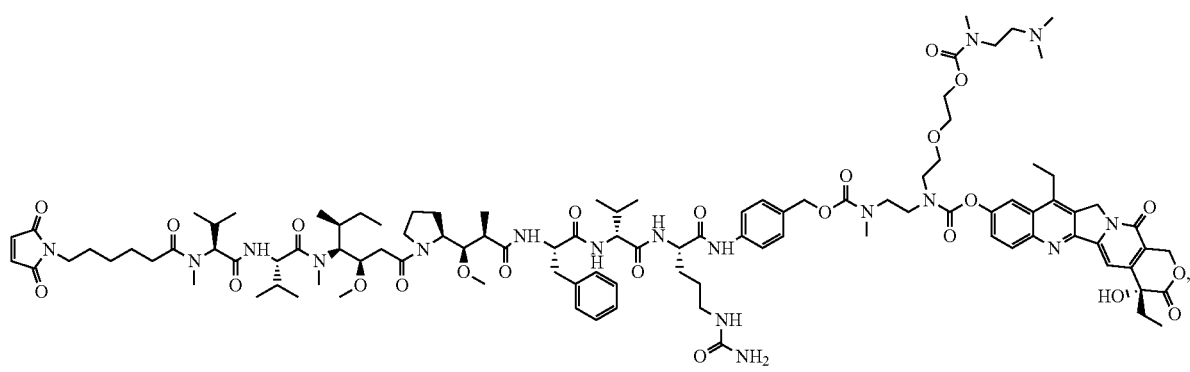
LD-3:Mc-MMAF-VC-PAB-DMEDA-PEG(N3)-SN38

-continued
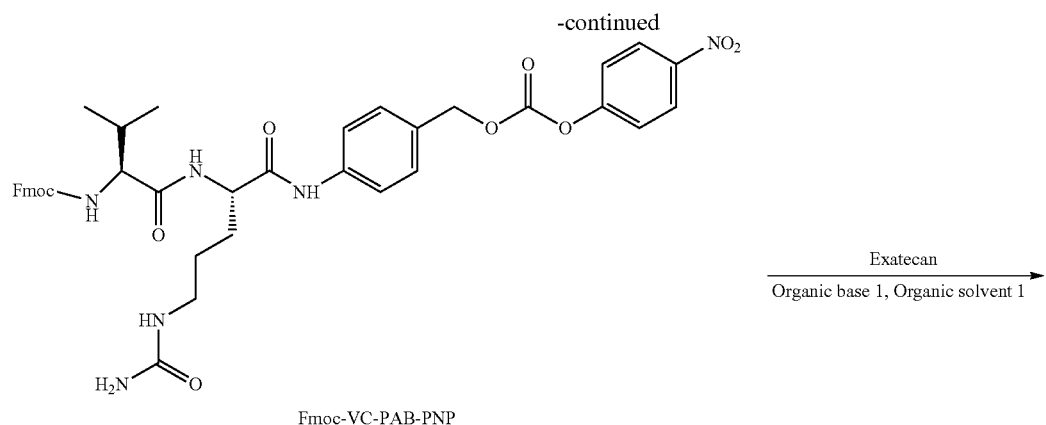
Fmoc-VC-PAB-PNP
→ Exatecan / Organic base 1, Organic solvent 1
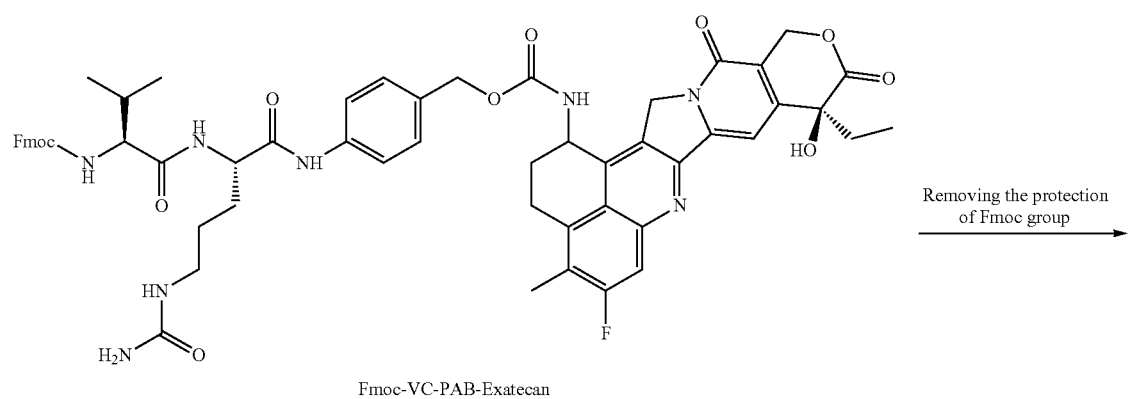
Fmoc-VC-PAB-Exatecan
→ Removing the protection of Fmoc group
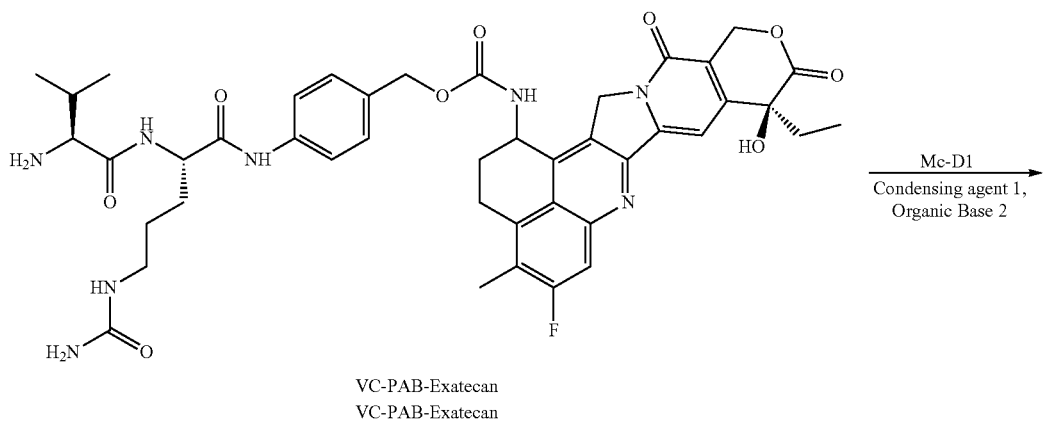
VC-PAB-Exatecan
VC-PAB-Exatecan
→ Mc-D1 / Condensing agent 1, Organic Base 2
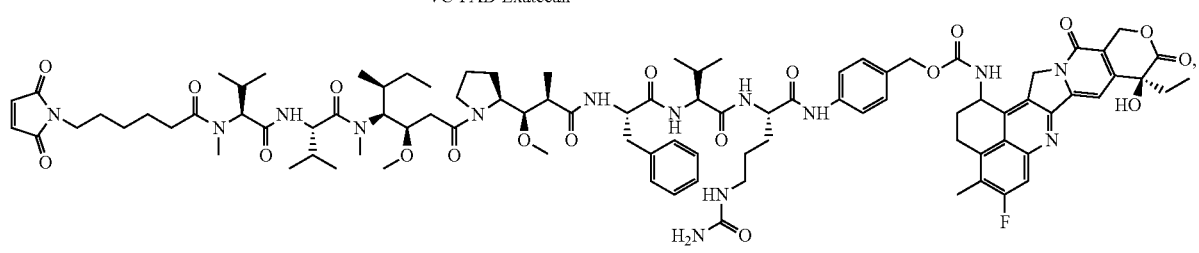
LD-4:Mc-MMAF-VC-PAB-Exatecan
or -continued
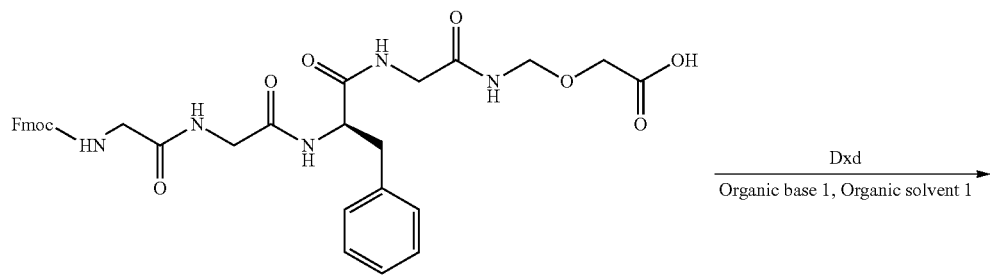
Fmoc-GGFG (SEQ ID NO: 1, GGFG)
→ Dxd / Organic base 1, Organic solvent 1
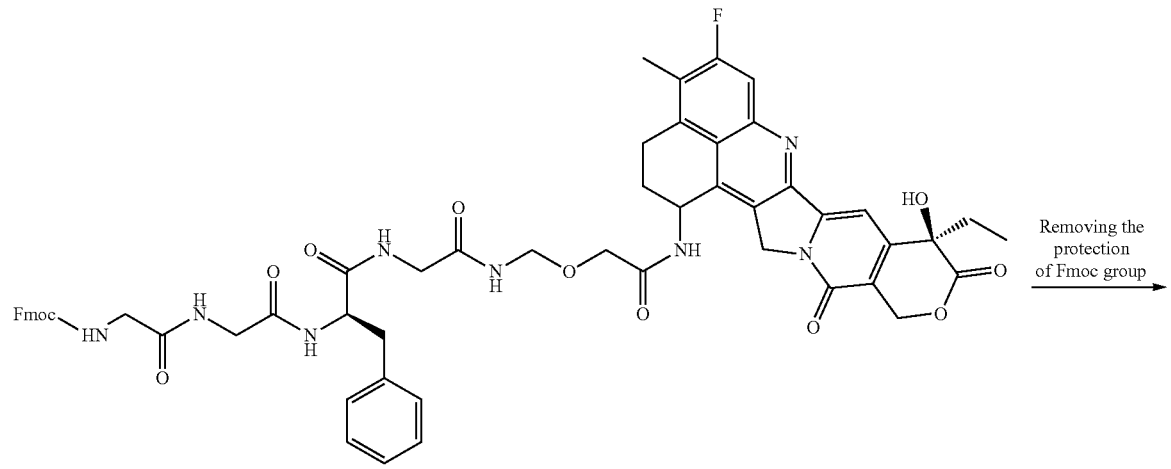
Fmoc-GGFG-Dxd (SEQ ID NO: 1, GGFG)
→ Removing the protection of Fmoc group
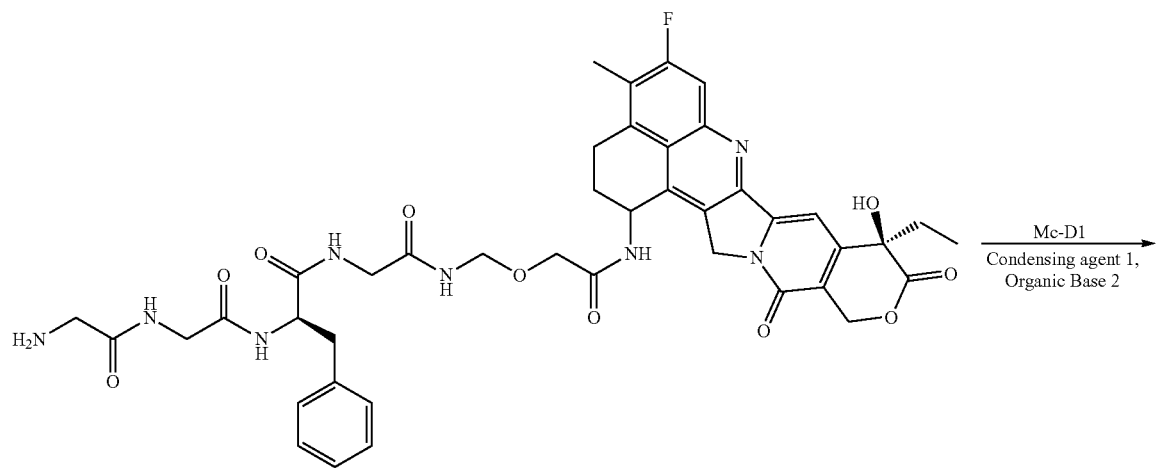
GGFG-Dxd (SEQ ID NO: 1, GGFG)
→ Mc-D1 / Condensing agent 1, Organic Base 2
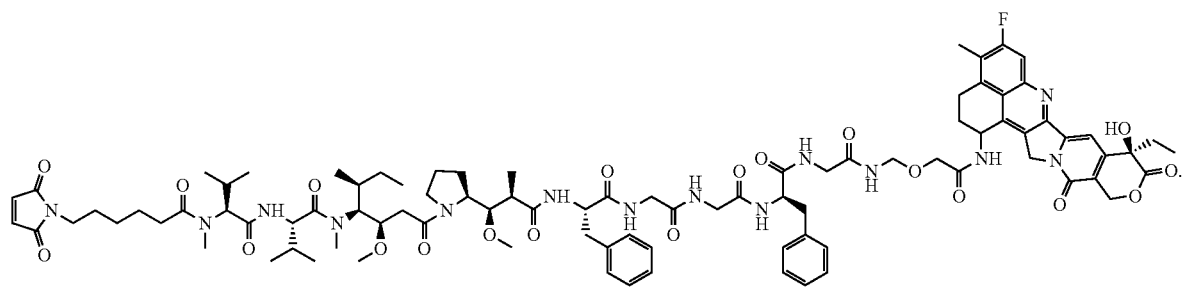
LD-5:Mc-MMAF-GGFG-Dxd (SEQ ID NO: 1, GGFG)

14. The intermediate compound according to claim 9, wherein $D_2$ is selected from the group consisting of MK4827 and Ceritinib.

\* \* \* \* \*